United States Patent
Jang et al.

(10) Patent No.: US 11,558,496 B2
(45) Date of Patent: Jan. 17, 2023

(54) ELECTRONIC DEVICE INCLUDING ANTENNA

(71) Applicant: SAMSUNG ELECTRONICS CO., LTD., Suwon-si (KR)

(72) Inventors: Seyoung Jang, Suwon-si (KR); Chulwoo Park, Suwon-si (KR); Dongil Son, Suwon-si (KR); Hyeongju Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/343,825

(22) Filed: Jun. 10, 2021

(65) Prior Publication Data

US 2021/0297514 A1   Sep. 23, 2021

Related U.S. Application Data

(63) Continuation of application No. 16/296,701, filed on Mar. 8, 2019.

(30) Foreign Application Priority Data

Mar. 9, 2018 (KR) .......................... 10-2018-0028195

(51) Int. Cl.
   *H04M 1/02* (2006.01)
   *H01Q 1/24* (2006.01)

(52) U.S. Cl.
   CPC ............ *H04M 1/026* (2013.01); *H01Q 1/243* (2013.01)

(58) Field of Classification Search
   CPC .... H04M 1/026; H04M 1/0277; H01Q 1/243; H01Q 1/38; H01Q 21/06; H01Q 21/08; H01Q 21/30; H01Q 1/526; H01Q 9/0407; H01Q 9/16
   See application file for complete search history.

(56) References Cited

U.S. PATENT DOCUMENTS

| 8,896,488 | B2 | 11/2014 | Ayala Vazquez et al. |
| 9,153,856 | B2 | 10/2015 | Rappoport et al. |
| 9,293,806 | B2 | 3/2016 | Kwong et al. |
| 9,653,778 | B2 | 5/2017 | Kwong et al. |
| 10,084,241 | B1 | 9/2018 | Jenwatanavet |

(Continued)

FOREIGN PATENT DOCUMENTS

| CN | 106104915 A | 11/2016 |
| DE | 2020 17002063 U1 | 8/2017 |

(Continued)

OTHER PUBLICATIONS

U.S. Appl. No. 16/296,701, filed Mar. 8, 2019; Jang et al.

(Continued)

*Primary Examiner* — Dinh Nguyen
(74) *Attorney, Agent, or Firm* — Nixon & Vanderhye P.C.

(57) ABSTRACT

An electronic device includes a housing including a first plate including a glass plate, a second plate facing the first plate, and a side surface surrounding a space between the first plate and the second plate, a display positioned inside the space and exposed through a first area of the first plate, an antenna structure at least partially overlapping a second area of the first plate when viewed from above the first plate and which is connected to the second area, and a processor.

30 Claims, 40 Drawing Sheets

(56) References Cited

U.S. PATENT DOCUMENTS

| | | | |
|---|---|---|---|
| 10,084,490 B2 | 9/2018 | Ouyang et al. | |
| 10,116,065 B2 | 10/2018 | Pan | |
| 10,134,540 B2 | 11/2018 | Choi et al. | |
| 10,168,782 B1* | 1/2019 | Tchon | G10K 11/34 |
| 10,297,900 B2 | 5/2019 | Lee et al. | |
| 10,305,172 B2 | 5/2019 | Noori et al. | |
| 10,622,703 B2 | 4/2020 | Hong et al. | |
| 2007/0024508 A1* | 2/2007 | Lee | H05K 1/0243 |
| | | | 343/702 |
| 2008/0259239 A1* | 10/2008 | Fang | G02F 1/133308 |
| | | | 349/60 |
| 2009/0262276 A1 | 10/2009 | Jeong | |
| 2010/0243742 A1* | 9/2010 | Ullmann | G06K 19/07752 |
| | | | 235/488 |
| 2011/0193753 A1 | 8/2011 | Kim et al. | |
| 2012/0223866 A1 | 9/2012 | Ayala Vazquez et al. | |
| 2012/0235881 A1 | 9/2012 | Pan et al. | |
| 2013/0050056 A1 | 2/2013 | Lee et al. | |
| 2014/0378191 A1* | 12/2014 | Hosoi | H04M 1/0258 |
| | | | 455/575.1 |
| 2015/0070228 A1 | 3/2015 | Gu et al. | |
| 2015/0116169 A1 | 4/2015 | Ying | |
| 2015/0255853 A1 | 9/2015 | Kwong et al. | |
| 2015/0255856 A1 | 9/2015 | Hong | |
| 2015/0295302 A1* | 10/2015 | Lee | H01Q 7/00 |
| | | | 343/702 |
| 2016/0087329 A1 | 3/2016 | Rappoport et al. | |
| 2016/0109999 A1* | 4/2016 | Lee | G06F 3/04883 |
| | | | 345/173 |
| 2016/0142867 A1* | 5/2016 | Kim | H02J 7/007 |
| | | | 455/41.1 |
| 2016/0164165 A1 | 9/2016 | Kwong et al. | |
| 2016/0336646 A1 | 11/2016 | Baek et al. | |
| 2017/0047791 A1 | 2/2017 | Jang | |
| 2017/0201011 A1 | 7/2017 | Khripkov et al. | |
| 2017/0212613 A1 | 7/2017 | Hwang et al. | |
| 2017/0244149 A1 | 8/2017 | Kim et al. | |
| 2017/0250475 A1* | 8/2017 | Liu | H01Q 1/243 |
| 2017/0309992 A1 | 10/2017 | Noori et al. | |
| 2017/0331175 A1 | 11/2017 | Kwon et al. | |
| 2018/0033571 A1 | 2/2018 | Choi et al. | |
| 2018/0338021 A1 | 11/2018 | Hebert | |
| 2018/0351235 A1* | 12/2018 | Wang | H01Q 21/30 |
| 2019/0058264 A1* | 2/2019 | Jung | H01Q 1/243 |
| 2019/0073001 A1* | 3/2019 | Kim | G02F 1/133308 |
| 2019/0131691 A1 | 5/2019 | Hong et al. | |

FOREIGN PATENT DOCUMENTS

| | | |
|---|---|---|
| KR | 10-2011-0092104 | 8/2011 |
| KR | 10-1127452 | 3/2012 |
| KR | 2012-0102513 A | 9/2012 |
| KR | 10-2016-0132649 | 11/2016 |
| KR | 10-2017-0087635 | 7/2017 |
| KR | 2017-0128015 A | 11/2017 |
| KR | 2018-0013436 A | 2/2018 |
| KR | 2018-0013436 A | 2/2018 |
| WO | WO 2016/168432 | 10/2016 |
| WO | WO 2017 119643 | 7/2017 |
| WO | WO 2017 199643 | 7/2017 |

OTHER PUBLICATIONS

International Search Report and Written Opinion dated Jul. 4, 2019 in counterpart International Patent Application No. PCT/KR2019/002704.
European Extended Search Report dated Nov. 25, 2020 for EP Application No. 19764064.2.
Chinese Office Action dated Apr. 29, 2022 for CN Application No. 201980008805.1.
Korean Office Action dated Feb. 7, 2022 for KR Application No. 10-2018-0028195.
Korean Notice of Allowance dated Aug. 23, 2022 for KR Application No. 10-2018-0028195.

* cited by examiner

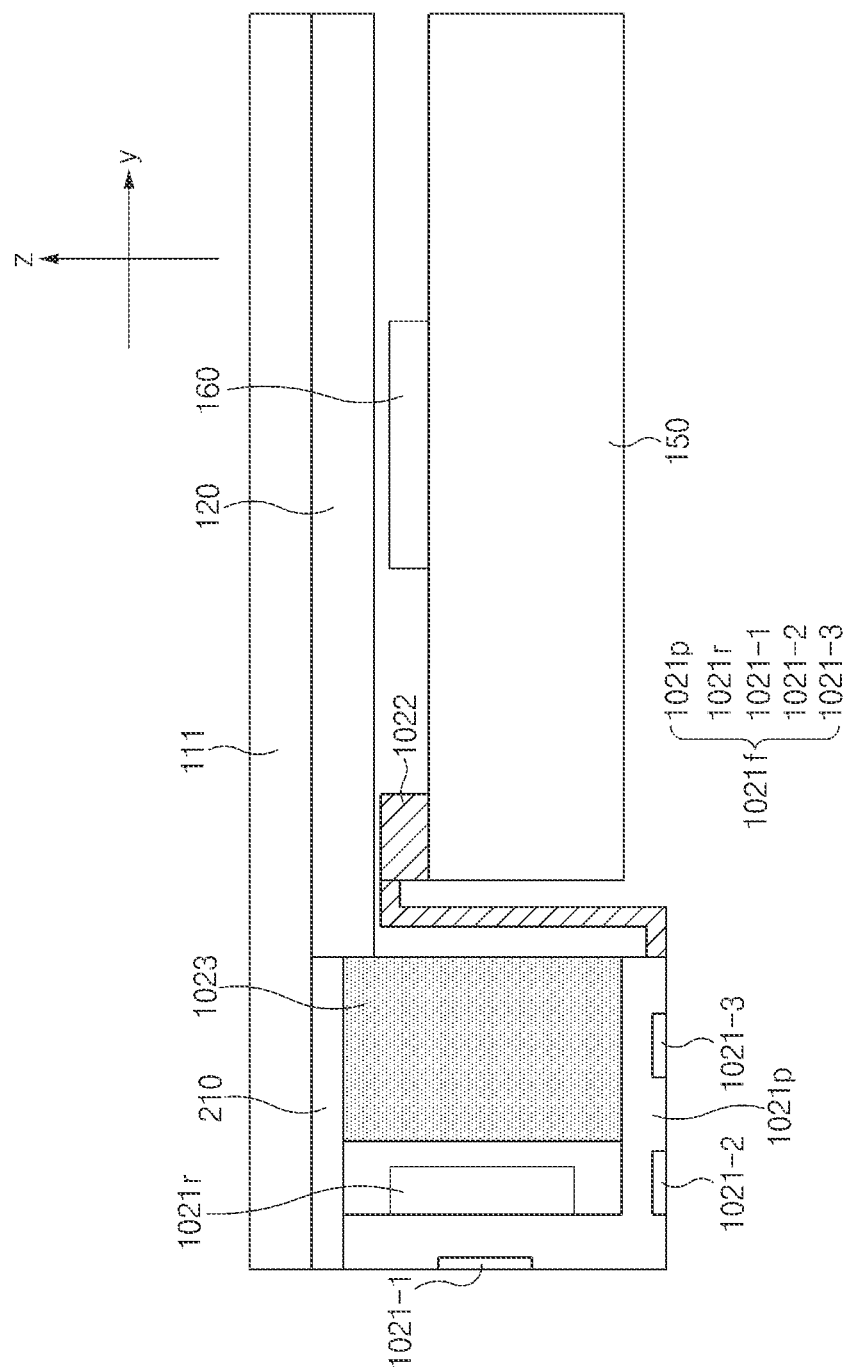

ELECTRONIC DEVICE INCLUDING ANTENNA

CROSS-REFERENCE TO RELATED APPLICATION

This application is a Continuation of U.S. application Ser. No. 16/296,701, filed Mar. 8, 2019, which claims priority to KR 10-2018-0028195, filed Mar. 9, 2018, the entire contents of which are all hereby incorporated herein by reference in their entireties.

BACKGROUND

1. Field

The present disclosure relates to a technology for mounting antennas and parts in an electronic device.

2. Description of Related Art

As an information technology (IT) develops, various types of electronic devices are widely being supplied. An electronic device may communicate with any other electronic device or a base station by using an antenna.

Nowadays, as the network traffic of a mobile device sharply increases, next-generation mobile communication technology using a signal in a ultra-high-frequency band, for example, 5th generation (5G) technology is being developed. If the signal in the ultra-high-frequency band is used, a wavelength of the signal may become short to a millimeter unit. Also, since the bandwidth may be used more widely, a significant amount of information may be transmitted or received. Since an antenna array has an effective isotropically radiated power (EIRP) greater than one antenna, the antenna array may transmit or receive various kinds of data more effectively. The signal in the ultra-high-frequency band may be referred to as a "millimeter wave signal".

An electronic device may be equipped with other parts in addition to the antenna structure. For example, the electronic device may be equipped with cover glass, a display, a printed circuit board, or a rear cover. As the various parts are mounted on an electronic device, the electronic device may lack the space in which the antenna structure is capable of being disposed.

The above information is presented as background information only to assist with an understanding of the present disclosure. No determination has been made, and no assertion is made, as to whether any of the above might be applicable as prior art with regard to the present disclosure.

SUMMARY

According to an embodiment of the present disclosure, at least one of the antenna structure and other parts may be disposed in the partial area of a display of the electronic device.

In accordance with an aspect of the present disclosure, an electronic device may include a housing including a first plate including a glass plate, a second plate facing the first plate, and a side surface surrounding a space between the first plate and the second plate, a display disposed inside the space and exposed through a first area of the first plate, an antenna structure comprising an antenna at least partly overlapping a second area of the first plate when viewed from above the first plate and being connected to the second area, a printed circuit board disposed in parallel to the first plate inside the space and electrically connected to a wireless communication circuit, and a processor disposed on the printed circuit board and connected to the display. The antenna structure may include a first structure including a first surface facing the side surface and a second surface facing away from the side surface, a first array of conductive patterns formed on the first surface or between the first surface and the second surface, wherein the wireless communication circuit, which is attached to the antenna structure or formed on the antenna structure, which is electrically connected to the first array, and which is configured to transmit and/or receive a signal in a frequency range of 3 GHz to 100 GHz.

In accordance with another aspect of the present disclosure, an electronic device may include a housing including a first plate including a first area and a second area surrounding the first area, a second plate facing the first plate, a side surface surrounding a space between the first plate and the second plate, a display disposed inside the space and exposed through the first area, an antenna structure disposed at a location corresponding to the second area in the space, a second printed circuit board disposed between the display and the second plate, and a processor disposed on the second printed circuit board and electrically connected to a wireless communication circuit. The antenna structure may include a first printed circuit board attached to the second area, a first antenna array disposed in an area adjacent to the second area in the first printed circuit board, wherein the wireless communication circuit configured to transmit and/or receive a signal in a specified frequency band by feeding power to the first antenna array.

According to various embodiments of the present disclosure, at least one of an antenna structure and other parts may be disposed in a display deactivation area of an electronic device, thereby improving the space utilization of the electronic device.

A variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 10B is a sectional view illustrating an example electronic device in which a first printed circuit board and a second printed circuit board are connected to each other, according to another embodiment;

DETAILED DESCRIPTION

Figure 1:
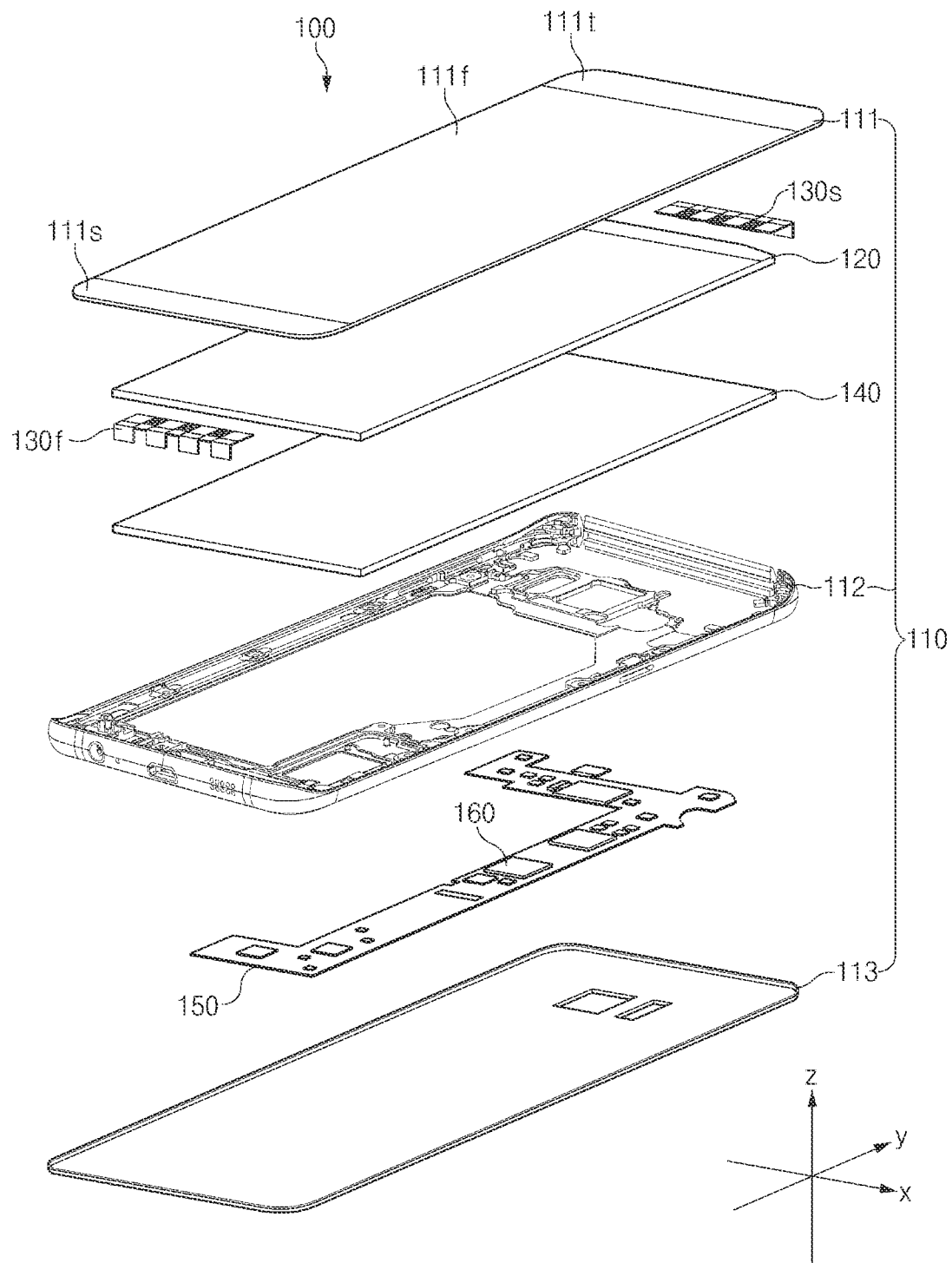
FIG. 1 is an exploded perspective view illustrating an example electronic device, according to an embodiment.

FIG. 1 is an exploded perspective view illustrating an example electronic device, according to an embodiment.

Referring to FIG. 1, an electronic device 100 may include housing 110, a display 120, a first antenna structure 130f, a second antenna structure 130s, a shield layer 140, a printed circuit board 150, and a processor 160. According to an embodiment, the electronic device 100 may be implemented without some of the components illustrated in FIG. 1 or may be implemented to further include one or more components not illustrated in FIG. 1. Also, the order in which the components included in the electronic device 100 are stacked may be different from the stacked order illustrated in FIG. 1.

The housing 110 may form an outer appearance of the electronic device 100. For example, the housing 110 may include a first plate 111, a second plate 113 facing the first plate 111, and a side member (e.g., including a side face) 112 surrounding the space between the first plate 111 and the second plate 113.

The first plate 111 may protect various components (e.g., the display 120) included in the electronic device 100 from an external impact. For example, the first plate 111 may include a transparent material, such as, for example, and without limitation, tempered glass, reinforced plastics, a flexible polymer material, or the like. According to an embodiment, the first plate 111 may be referred to as "cover glass".

According to an embodiment, the first plate 111 may include a first area 111f, a second area 111s, or a third area 111t. The first area 111f may transmit light generated by the display 120. The second area 111s or the third area 111t may surround or be adjacent to the first area 111f, and various sensors (e.g., an illuminance sensor and a camera) may be exposed through the second area 111s or the third area 111t. In this disclosure, the second area 111s and/or the third area 111t may be referred to as a "bezel area".

The side member (e.g., including a side surface) 112 may form an outer appearance of a side surface of the electronic device 100. Furthermore, various components included in the electronic device 100 may be mounted in the side member 112.

The second plate 113 may be coupled in the direction '-z' of the side member 112. The second plate 113 may include, for example, and without limitation, tempered glass, plastic, and/or metal, or the like. According to an embodiment, the second plate 113 may be integrally implemented with the side member 112 or may be implemented to be removable by a user.

The first antenna structure 130f and the second antenna structure 130s may be disposed in the direction '-z' of the second area 111s or the third area 111t, respectively. For example, the first antenna structure 130f may be disposed in the direction '-z' of the second area 111s, and the second antenna structure 130s may be disposed in the direction '-z' of the third area 111t.

According to an embodiment, the first antenna structure 130f may transmit and/or receive a signal in a specified frequency band (e.g., 3 GHz to 100 GHz). Moreover, the first antenna structure 130f may transmit and/or receive a signal in the direction 'z', direction '-z', and/or direction '-y'.

In the electronic device 100 according to an embodiment of the present disclosure, since the first antenna structure 130f is disposed in the second area 111s, or the third area 111t, the thickness of the electronic device 100 may be reduced. Also, since the first antenna structure 130f is disposed in the second area 111s or the third area 111t, the electronic device 100 may transmit and/or receive a signal in the direction 'z'. In the present disclosure, the description given with regard to the first antenna structure 130f may also be applied to the second antenna structure 130s.

The display 120 may be disposed in the direction '-z' of the first area 111f. The display 120 may be electrically connected with the printed circuit board 150, and may output content (e.g., a text, an image, a video, an icon, a widget, or a symbol) and/or may receive a touch input (e.g., a touch, a gesture, or a hovering) from the user.

The shield layer 140 may be interposed between the display 120 and the side member 112. The shield layer 140 may, for example, shield an electro-magnetic wave generated between the display 120 and the printed circuit board 150 to prevent and/or reduce an electro-magnetic interference between the display 120 and the printed circuit board 150.

Various types of electronic parts, elements, and/or printed circuits of the electronic device 100 may be mounted on the printed circuit board 150 or a second printed circuit board. For example, and without limitation, an application processor (AP), a communication processor (CP), and/or a memory may be mounted on the printed circuit board 150. In this disclosure, the printed circuit board 150 may be referred to as a "main board" or a "printed board assembly (PBA)".

The processor 160 may be electrically connected to the first antenna structure 130f and the second antenna structure 130s. The processor 160 may transmit and/or receive a signal in a specified frequency band (e.g., 3 GHz to 100 GHz) by feeding power to the first antenna structure 130f and the second antenna structure 130s. For example, the signal emitted from the first antenna structure 130f and the second antenna structure 130s may be radiated in the direction 'z', direction '-z', direction 'y', and/or direction '-y'. In the present disclosure, the processor 160 may be referred to, for example, and without limitation, as a "communication processor (CP)".

In the present disclosure, the description given with reference to FIG. 1 may be identically applied to components having the same reference numerals/marks as the components of the electronic device 100 described with reference to FIG. 1. Moreover, in the present disclosure, the direction 'y' may refer, for example, the direction in which the second antenna structure 130s is positioned with respect to the first antenna structure 130f; the direction 'z' may refer, for example, to the direction in which the first plate 111 is positioned with respect to the first antenna structure 130f; the direction 'x' may refer, for example, to the direction perpendicular to each of the direction 'y' and the direction 'z'.

Figure 2A:
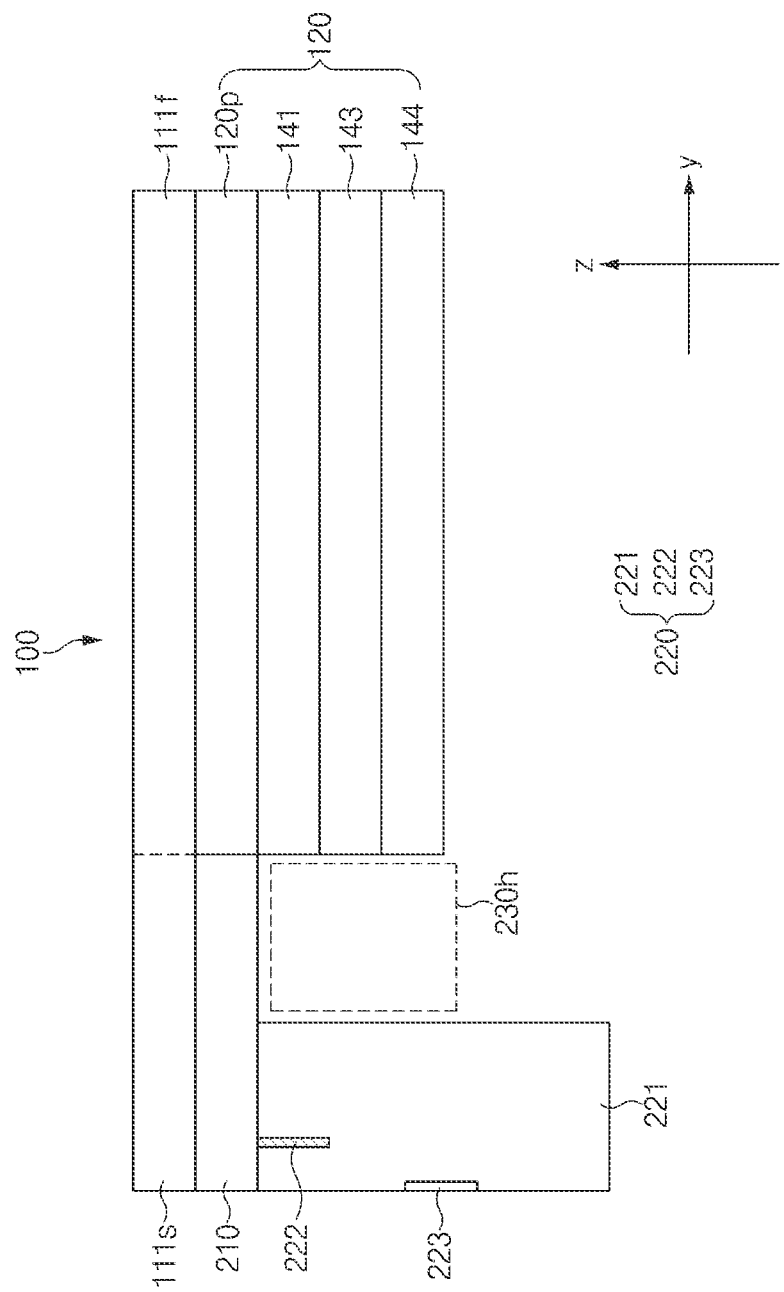
FIG. 2A is a sectional view illustrating an example antenna structure including a first antenna array and a second antenna array, according to an embodiment.
Figure 2B:
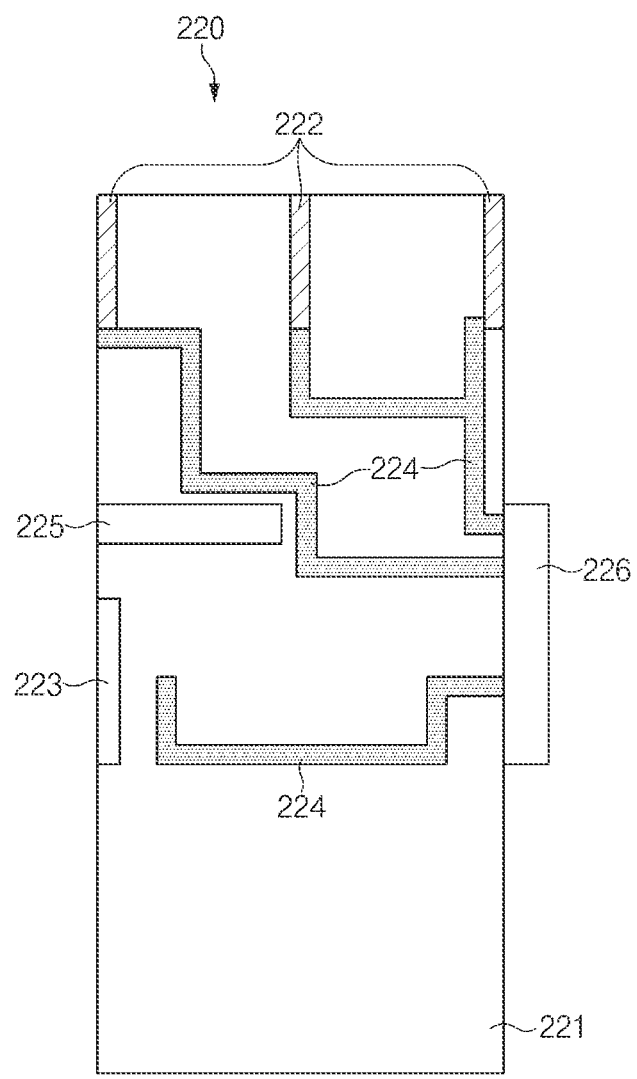
FIG. 2B diagram illustrating an example antenna structure including a first antenna array and a second antenna array, according to an embodiment.

FIG. 2A is a sectional view illustrating an example antenna structure including a first antenna array and a second antenna array, according to an embodiment. FIG. 2B is a diagram illustrating an example antenna structure including a first antenna array and a second antenna array, according to an embodiment. FIG. 2B illustrates a detailed structural view of an antenna structure 220 illustrated in FIG. 2A.

Figure 2C:
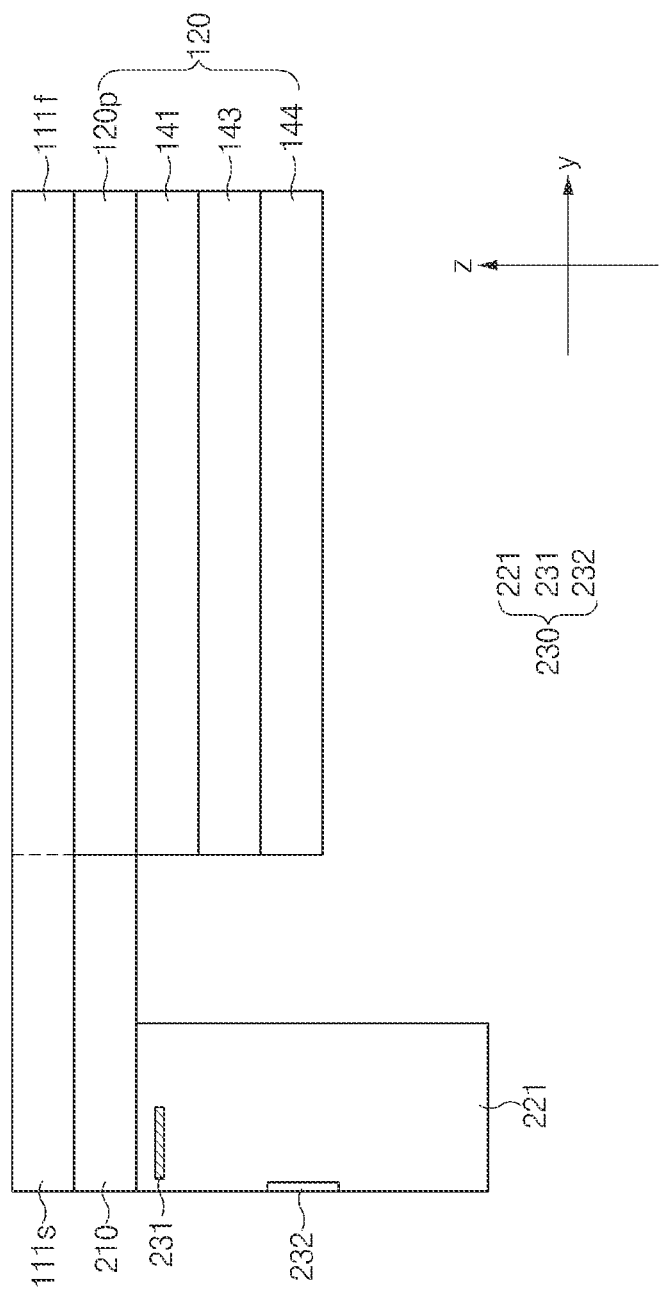
FIG. 2C is a sectional view illustrating an example antenna structure including a first antenna array and a second antenna array, according to another embodiment.
Figure 2D:
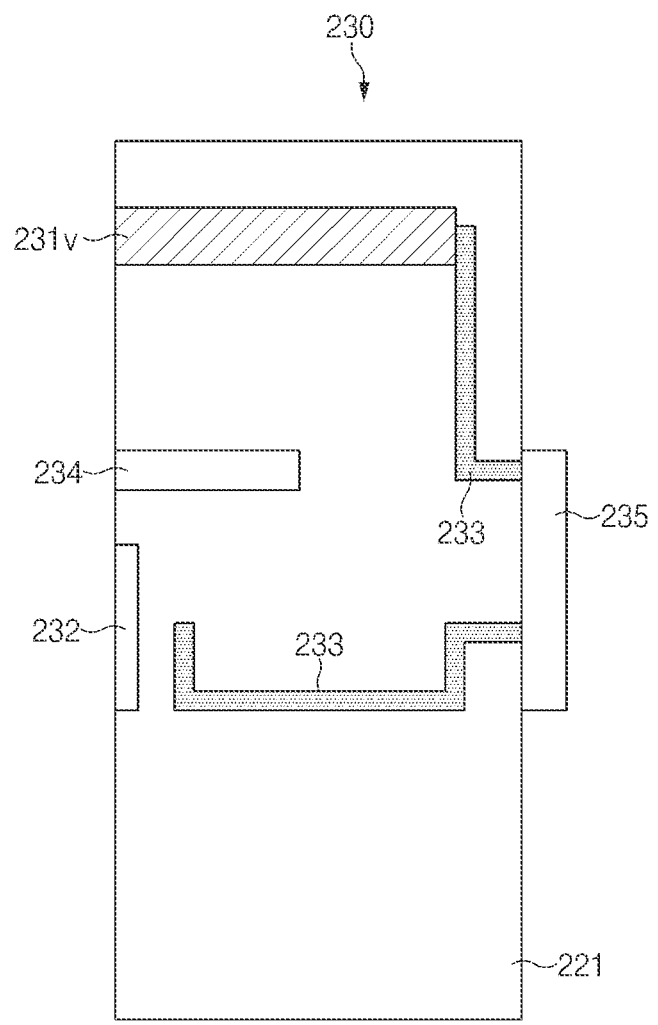
FIG. 2D is a diagram illustrating an example antenna structure including a first antenna array and a second antenna array, according to another embodiment.

FIG. 2C is a sectional view illustrating an example antenna structure including a first antenna array and a second antenna array, according to another embodiment. FIG. 2D is a diagram illustrating an example antenna structure including a first antenna array and a second antenna array, according to another embodiment. FIG. 2D illustrates a detailed structural view of an antenna structure 230 illustrated in FIG. 2C.

Figure 2E:
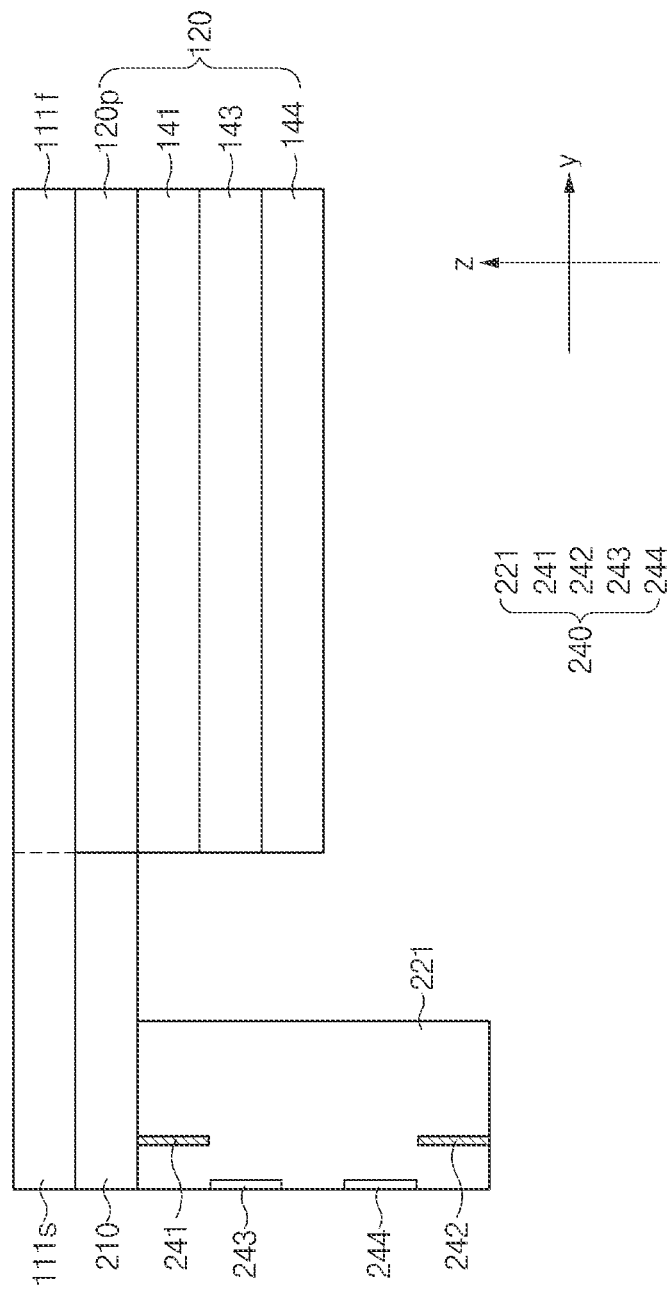
FIG. 2E is a sectional view illustrating an example antenna structure including a first antenna array and a second antenna array, according to still another embodiment.
Figure 2F:
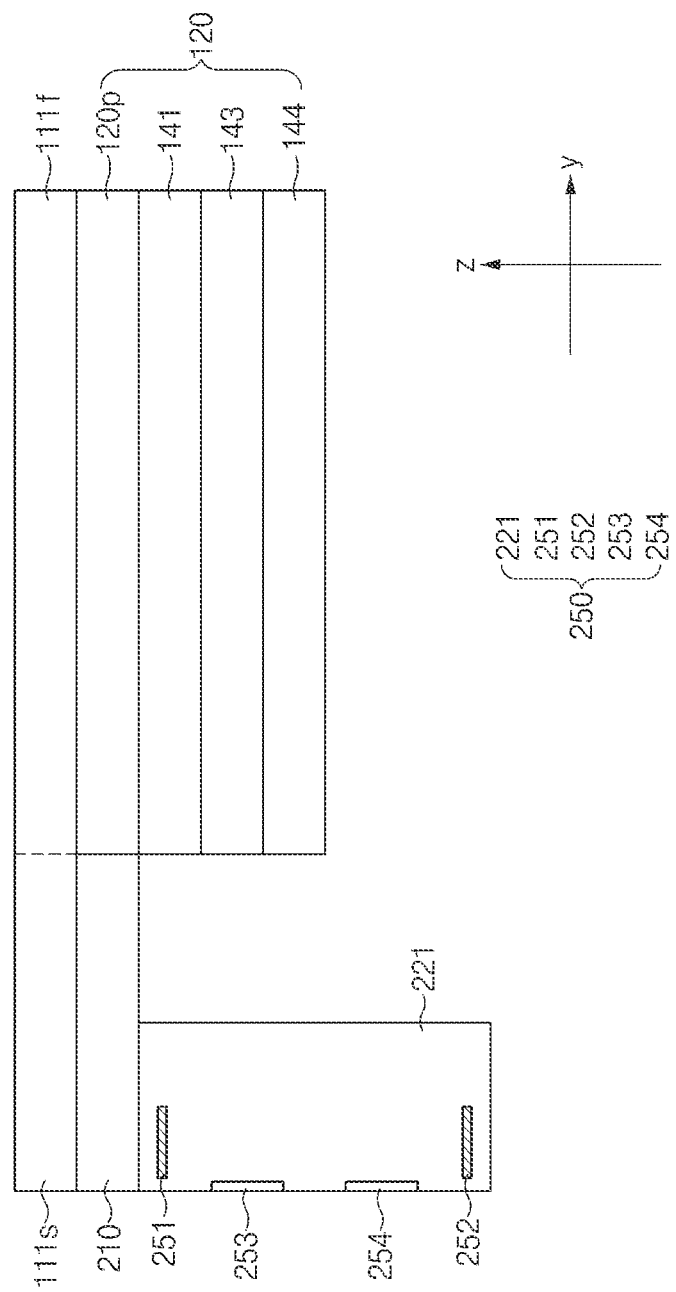
FIG. 2F is a sectional view illustrating an example antenna structure including a first antenna array and a second antenna array, according to still another embodiment.

FIG. 2E is a sectional view illustrating an example antenna structure including a first antenna array and a second antenna array, according to still another embodiment. FIG. 2F is a sectional view illustrating an example antenna structure including a first antenna array and a second antenna array, according to still another embodiment.

Referring to FIG. 2A, the antenna structure 220 (e.g., the first antenna structure 130f or the second antenna structure 130s of FIG. 1) may be attached to the second area 111s. For example, an adhesive member 210 may be disposed between the antenna structure 220 and the second area 111s, and the antenna structure 220 may be attached to the second area 111s through the adhesive member 210. When the antenna structure 220 is attached to the second area 111s, the antenna structure 220 is positioned on substantially the same plane as some areas (e.g., an embossing layer 141, a copper sheet 143, and a heat sink sheet 144) of the display 120.

According to an embodiment, an empty space 230h may be formed between the antenna structure 220 and the display 120, and various electronic parts (e.g., a fingerprint sensor or an illuminance sensor) may be disposed in the empty space 230h. The description about the empty space 230h illustrated in FIG. 2A may be applied to various embodiments to be described below.

According to an embodiment, the antenna structure 220 may include a printed circuit board 221 (or a first printed circuit board), a first antenna array 222, and/or a second antenna array 223. According to an embodiment, a communication circuit (not illustrated) may be disposed in the antenna structure 220. For example, the first antenna array 222 or the second antenna array 223 may include, for example, and without limitation, at least one of a patch antenna array, a dipole antenna array, or the like.

In the present disclosure, the printed circuit board (e.g., the printed circuit board 221) included in the antenna structure (e.g., the first antenna structure 130f or the second antenna structure 130s of FIG. 1) may be referred to as a "first printed circuit board", and the printed circuit board 150 interposed between the display 120 and the second plate 113 may be referred to as a "second printed circuit board".

In the case of FIG. 2A, the antenna structure 220 may include the first antenna array 222 and the second antenna array 223. For example, the first antenna array 222 may include a dipole antenna. For another example, the second antenna array 223 may include a patch antenna. The first antenna array 222 may face in the direction 'z', and the second antenna array 223 may face in the direction '−y'. The first antenna array 222 may transmit and/or receive a signal in the direction 'z' and the direction '−y'. The second antenna array 223 may transmit and/or receive a signal in the direction '−y'.

According to an embodiment, the display 120 may include a display panel 120p, the embossing layer 141, the copper sheet 143, and the heat sink sheet 144.

According to an embodiment, a plurality of pixels and a plurality of wires for applying power to the pixels may be mounted in the display panel 120p. The embossing layer 141 may protect other parts from impact by absorbing the impact applied to the electronic device 100. The copper sheet 143 may shield electromagnetic waves generated between the display 120 and the printed circuit board 150. The heat sink sheet 144 may disperse heat generated from the display 120. Although not illustrated in FIG. 2A, the display 120 may further include a digitizer that senses the location of the user input based on the electromagnetic field that changes in the first area 111f.

According to an embodiment, the first antenna array 222 may include a plurality of dipole antennas arranged in the direction 'x' or the direction '−x' when viewed from above the cover glass 111. Furthermore, the second antenna array 223 may include a plurality of patch antennas arranged in the direction 'x' or the direction '−x' when viewed from above the cover glass 111.

Referring to FIG. 2B, the first antenna array 222 may include multiple dipole antennas. The first antenna array 222 may be connected to a wireless communication circuit 226 via a feed line 224. The wireless communication circuit 226 may feed power to the first antenna array 222 through the feed line 224. When the wireless communication circuit 226 feeds power to the first antenna array 222, the first antenna array 222 may form beams in orthogonal directions. The signal transmission/reception rate of the antenna structure 220 may be improved as the first antenna array 222 forms beams in orthogonal directions.

According to an embodiment, the second antenna array 223 may be disposed on one surface of the printed circuit board 221. For example, the second antenna array 223 may include patch antennas. The wireless communication circuit 226 may directly feed power to the second antenna array 223 via the feed line 224, or may indirectly feed power to the second antenna array 223. When feeding power to the second antenna array 223, the wireless communication circuit 226 may transmit and/or receive the signal in a specified frequency band via the second antenna array 223.

According to an embodiment, a via 225 may be formed on the printed circuit board 221. The via 225 may improve isolation between the first antenna array 222 and the second antenna array 223.

Referring to FIG. 2C, the antenna structure 230 (e.g., the first antenna structure 130f or the second antenna structure 130s of FIG. 1) may include a first antenna array 231 and a second antenna array 232. For example, the first antenna array 231 may include dipole antennas. The second antenna array 232 may include patch antennas. The first antenna array 231 and the second antenna array 232 may be disposed such that beams are formed in the direction '−y'. For example, the first antenna array 231 may transmit and/or receive a signal in the direction '−y'. The second antenna array 232 may transmit and/or receive a signal in the direction '−y'.

When the antenna structure 220 illustrated in FIG. 2A is compared with the antenna structure 230 illustrated in FIG. 2C, the directions the beams formed by the first antenna array 222 of FIG. 2A and the first antenna array 231 of FIG. 2C may be different from each other. Since the first antenna array 222 of FIG. 2A forms a beam in the direction 'z', the intensity of the signal radiated in the direction 'z' may be stronger than the intensity of the signal radiated in the direction '−y'. Since the first antenna array 231 of FIG. 2C forms a beam in the direction '−y', the intensity of the signal radiated in the direction '−y' may be stronger than the intensity of the signal radiated in the direction 'z'.

Referring to FIG. 2D, the antenna structure 230 may use a first via 231v as the first antenna array 231. For example, a wireless communication circuit 235 and the first via 231v may be electrically connected to each other through a feed line 233. The wireless communication circuit 235 may feed power to the first via 231v through the feed line 233 directly or indirectly. The first via 231v may transmit and/or receive a signal in a specified frequency band.

According to an embodiment, the second antenna array 232 may be disposed on one surface of the printed circuit board 221. The wireless communication circuit 235 may directly feed power to the second antenna array 232 via the feed line 233, or may indirectly feed power to the second antenna array 223.

According to an embodiment, a second via 234 may be formed on the printed circuit board 221. The second via 234 may improve isolation between the first antenna array 231 and the second antenna array 232.

Referring to FIG. 2E, an antenna structure 240 (e.g., the first antenna structure 130f or the second antenna structure 130s of FIG. 1) may include a first antenna array 241, a second antenna array 242, a third antenna array 243, and a fourth antenna array 244. For example, each of the first antenna array 241 and the second antenna array 242 may include dipole antennas, and each of the third antenna array 243 and the fourth antenna array 244 may include patch antennas.

According to an embodiment, the first antenna array 241 and the second antenna array 242 may be disposed to form beams in the direction 'z' and the direction '−z', respectively. The third antenna array 243 and the fourth antenna array 244 may be disposed to form beams in the direction '−y', respectively. For example, the first antenna array 241 may transmit and/or receive a signal in the direction 'z'. For example, the second antenna array 242 may transmit and/or receive a signal in the direction '−z'. For example, the third antenna array 243 and fourth antenna array 244 may transmit and/or receive a signal in the direction '−y'.

Referring to FIG. 2F, an antenna structure 250 (e.g., the first antenna structure 130f or the second antenna structure 130s of FIG. 1) may include a first antenna array 251, a second antenna array 252, a third antenna array 253, and a fourth antenna array 254. For example, each of the first antenna array 251 and the second antenna array 252 may include dipole antennas, and each of the third antenna array 253 and the fourth antenna array 254 may include patch antennas. The first antenna array 251, the second antenna array 252, the third antenna array 253, and the fourth antenna array 254 may be disposed to form beams in the direction '−y', respectively. When the antenna structure 240 illustrated in FIG. 2E is compared with the antenna structure 250 illustrated in FIG. 2F, the directions of the first antenna array 241 of FIG. 2E and the first antenna array 251 of FIG. 2F may be different. For another example, the directions of the second antenna array 242 of FIG. 2E and the second antenna array 252 of FIG. 2F may be different. As such, the intensity of each of the signals radiated in the direction 'z' and the direction '−z' by the first antenna array 241 and the second antenna array 242 of FIG. 2E may be somewhat stronger than the intensity of the signal radiated in the direction '−y'. The intensity of each of the signals radiated in the direction '−y' by the first antenna array 251 and the second antenna array 252 of FIG. 2F may be somewhat stronger than the intensity of each of the signals radiated in the direction 'z' and the direction '−z'.

Figure 3A:
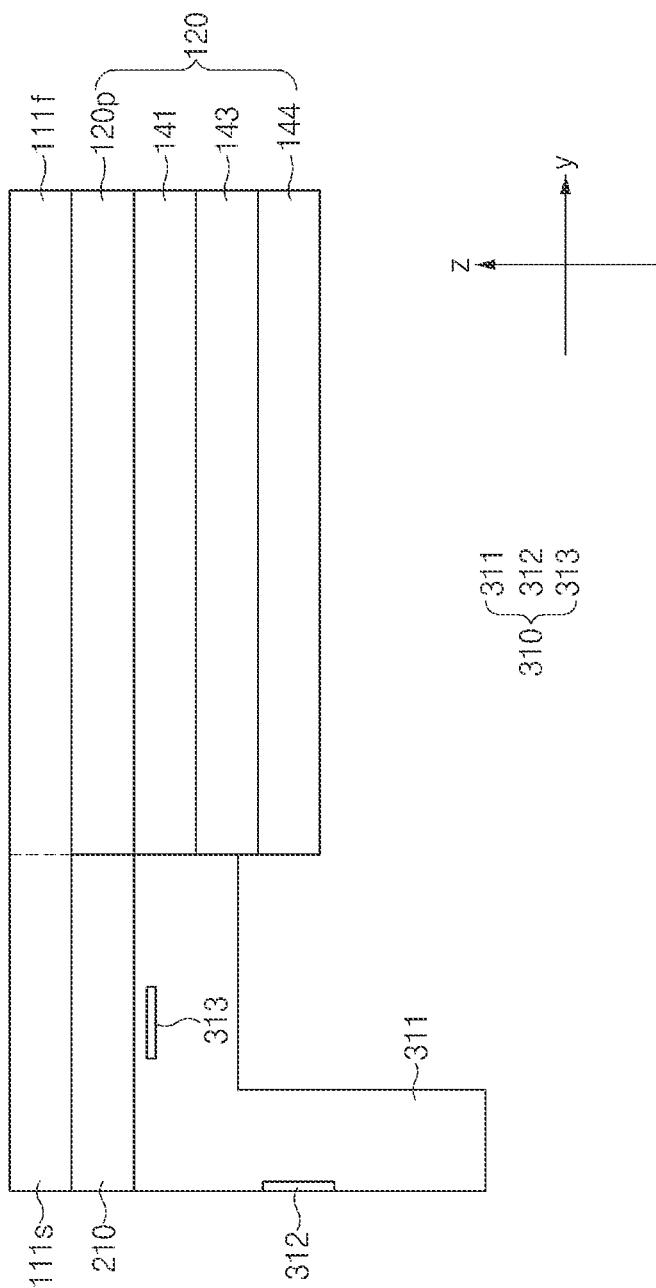
FIG. 3A is a sectional view illustrating an example antenna structure including an antenna array, according to an embodiment.
Figure 3B:
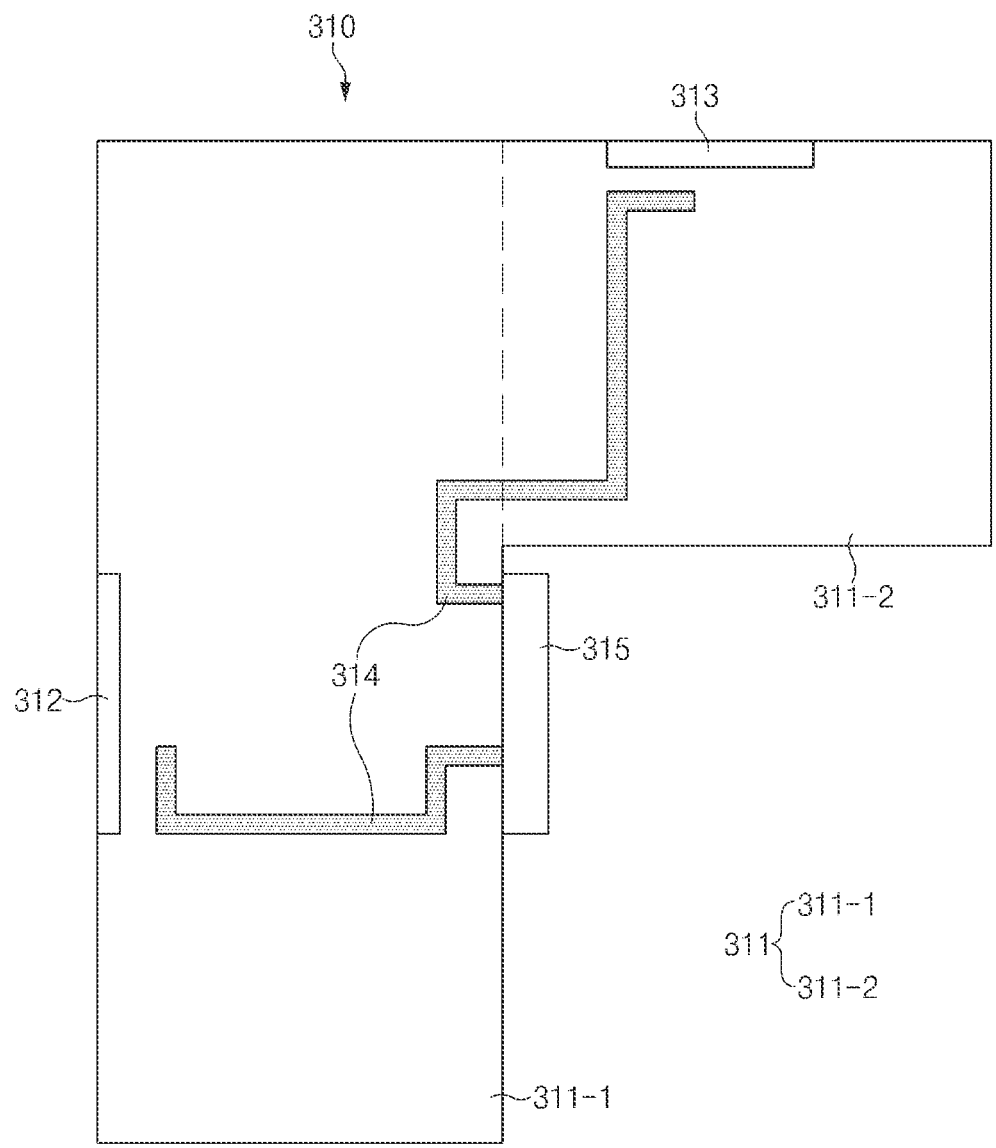
FIG. 3B is a diagram illustrating an example antenna structure including an antenna array, according to an embodiment.

FIG. 3A is a sectional view illustrating an example antenna structure including an antenna array, according to an embodiment. FIG. 3B is a diagram illustrating an example antenna structure including an antenna array, according to an embodiment. FIG. 3B illustrates a detailed structural view of an antenna structure 310 illustrated in FIG. 3A.

Figure 3C:
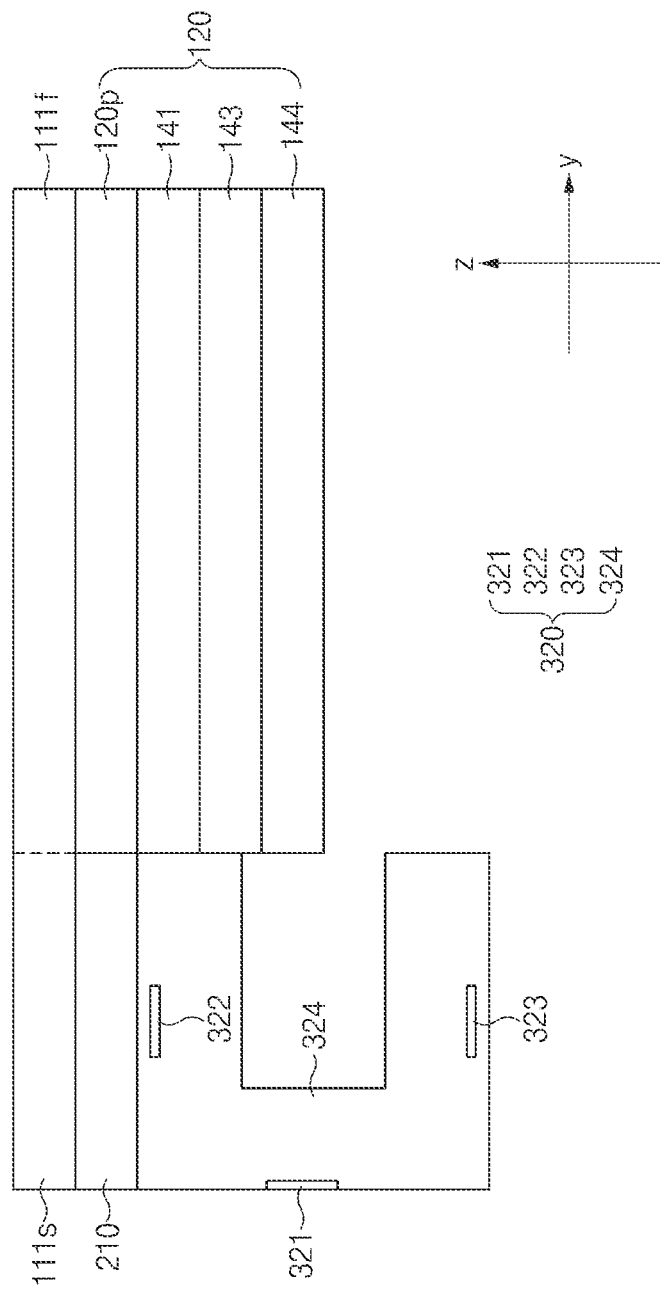
FIG. 3C is a sectional view illustrating an example antenna structure including an antenna array, according to another embodiment.
Figure 3D:
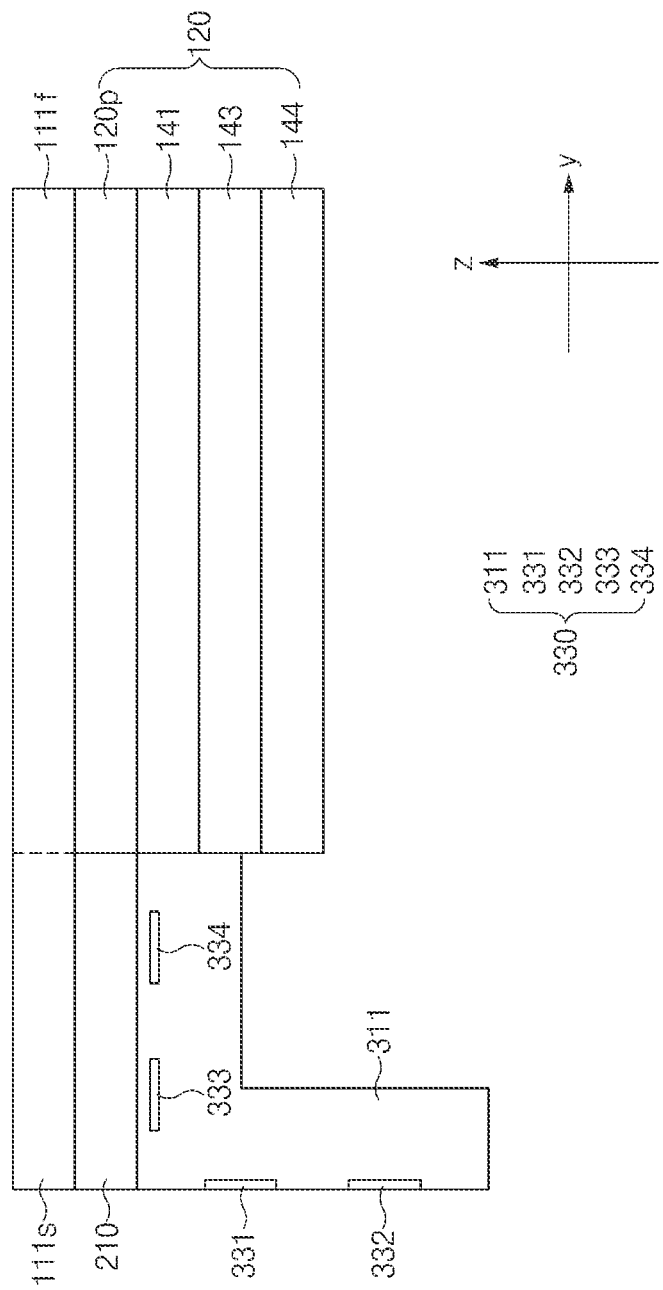
FIG. 3D is a sectional view illustrating an example antenna structure including an antenna array, according to still another embodiment.
Figure 3E:
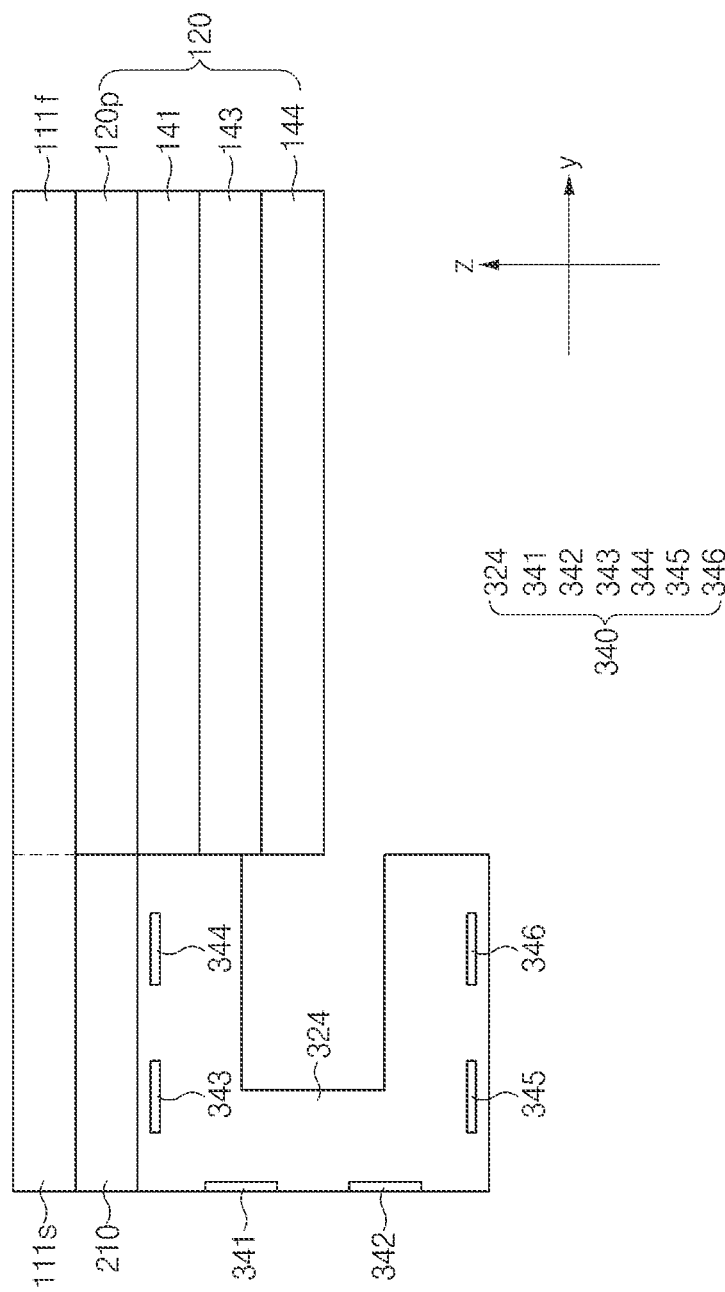
FIG. 3E is a sectional view illustrating an example antenna structure including an antenna array, according to still another embodiment.

FIG. 3C is a sectional view illustrating an example antenna structure including an antenna array, according to another embodiment. FIG. 3D is a diagram illustrating an example antenna structure including an antenna array, according to still another embodiment. FIG. 3E is a sectional view illustrating an example antenna structure including an antenna array, according to still another embodiment.

Referring to FIG. 3A, the antenna structure 310 (e.g., the first antenna structure 130f or the second antenna structure 130s of FIG. 1) may include a printed circuit board 311 (or a first printed circuit board), a first antenna array 312, and/or a second antenna array 313. For example, the first antenna array 312 or the second antenna array 313 may include patch antennas or dipole antennas, respectively.

According to an embodiment, the printed circuit board 311 may have an inverted 1' shape. In the case of FIG. 3A, the first antenna array 312 may be disposed on one surface, which is capable of forming a beam in the direction '−y', of the inverted 1' shape of the printed circuit board 311; the second antenna array 313 may be disposed on the other surface, which is capable of forming a beam in the direction 'z', of the inverted shape of the printed circuit board 311. For example, the first antenna array 312 may transmit and/or receive a signal in the direction '−y'. The second antenna array 313 may transmit and/or receive a signal in the direction 'z'.

Referring to FIG. 3B, according to an embodiment, the first antenna array 312 and the second antenna array 313 may be connected to a wireless communication circuit 315 directly or indirectly. When the first antenna array 312 and the second antenna array 313 are directly connected to the wireless communication circuit 315, the first antenna array 312 and the second antenna array 313 may be electrically connected to the wireless communication circuit 315 via a feed line 314. The wireless communication circuit 315 may transmit and/or receive a signal in a specified frequency band by feeding power to the first antenna array 312 and the second antenna array 313 directly or indirectly.

According to an embodiment, the printed circuit board 311 may include a first structure 311-1 and a second structure 311-2. The first structure 311-1 and the second structure 311-2 may be manufactured as a single printed circuit board. For example, the printed circuit board 311 may include the first structure 311-1 and the second structure 311-2 by applying the heat of a specific temperature or more to a portion where bending is required after the wire and the part are mounted.

Referring to FIG. 3C, an antenna structure 320 (e.g., the first antenna structure 130f or the second antenna structure 130s of FIG. 1) may include a first antenna array 321, a second antenna array 322, and a third antenna array 323. For example, each of the first antenna array 321, the second antenna array 322, and the third antenna array 323 may include patch antennas or dipole antennas. In the case of FIG. 3C, a printed circuit board 324 may have a shape. The first antenna array 321 may be disposed on one surface, which faces in the direction '−y', of the printed circuit board 324; the second antenna array 322 may be disposed on one surface, which faces in the direction 'z', of the printed circuit board 324; the third antenna array 323 may be disposed on one surface, which faces in the direction '−z', of the printed circuit board 324. For example, the first antenna array 321 may form a beam in the direction '−y'; the second antenna array 322 may form a beam in the direction 'z'; the third antenna array 323 may form a beam in the direction '−z'; the first antenna array 321, the second antenna array 322, and the third antenna array 323 may transmit and/or receive signals. Since the antenna structure 320 illustrated in FIG. 3C includes third antenna array 323, the antenna structure 320 may transmit and/or receive a signal in the direction '−z', unlike the antenna structure 310 illustrated in FIG. 3A.

Referring to FIG. 3D, an antenna structure 330 (e.g., the first antenna structure 130f or the second antenna structure 130s of FIG. 1) may include a first antenna array 331, a second antenna array 332, a third antenna array 333, and a fourth antenna array 334. For example, each of the first antenna array 331, the second antenna array 332, the third antenna array 333, and the fourth antenna array 334 may include patch antennas or dipole antennas. In the case of FIG. 3D, the first antenna array 331 and the second antenna array 332 may form beams in the direction '−y', and the third antenna array 333 and the fourth antenna array 334 may form beams in the direction 'z'. For example, the first antenna array 331 and the second antenna array 332 may transmit and/or receive signals in the direction '−y', and the third antenna array 333 and the fourth antenna array 334 may transmit and/or receive signals in the direction 'z'.

Referring to FIG. 3E, an antenna structure 340 (e.g., the first antenna structure 130f or the second antenna structure 130s of FIG. 1) may include the printed circuit board 324, a first antenna array 341, a second antenna array 342, a third antenna array 343, a fourth antenna array 344, a fifth antenna array 345, and a sixth antenna array 346. For example, each of the first antenna array 341, the second antenna array 342, the third antenna array 343, the fourth antenna array 344, the fifth antenna array 345, and the sixth antenna array 346 may include patch antennas or dipole antennas. For example, the printed circuit board 324 may have a shape.

According to an embodiment, the first antenna array 341 and the second antenna array 342 may form beams in the direction '-y'; the third antenna array 343 and the fourth antenna array 344 may form beams in the direction 'z'; the fifth antenna array 345 and the sixth antenna array 346 may form beams in the direction '-z'. According to an embodiment, the first antenna array 341 and the second antenna array 342 may transmit and/or receive signals in the direction '-y'; the third antenna array 343 and the fourth antenna array 344 may transmit and/or receive signals in the direction 'z'; the fifth antenna array 345 and the sixth antenna array 346 may transmit and/or receive signals in the direction '-z'.

Figure 4A:
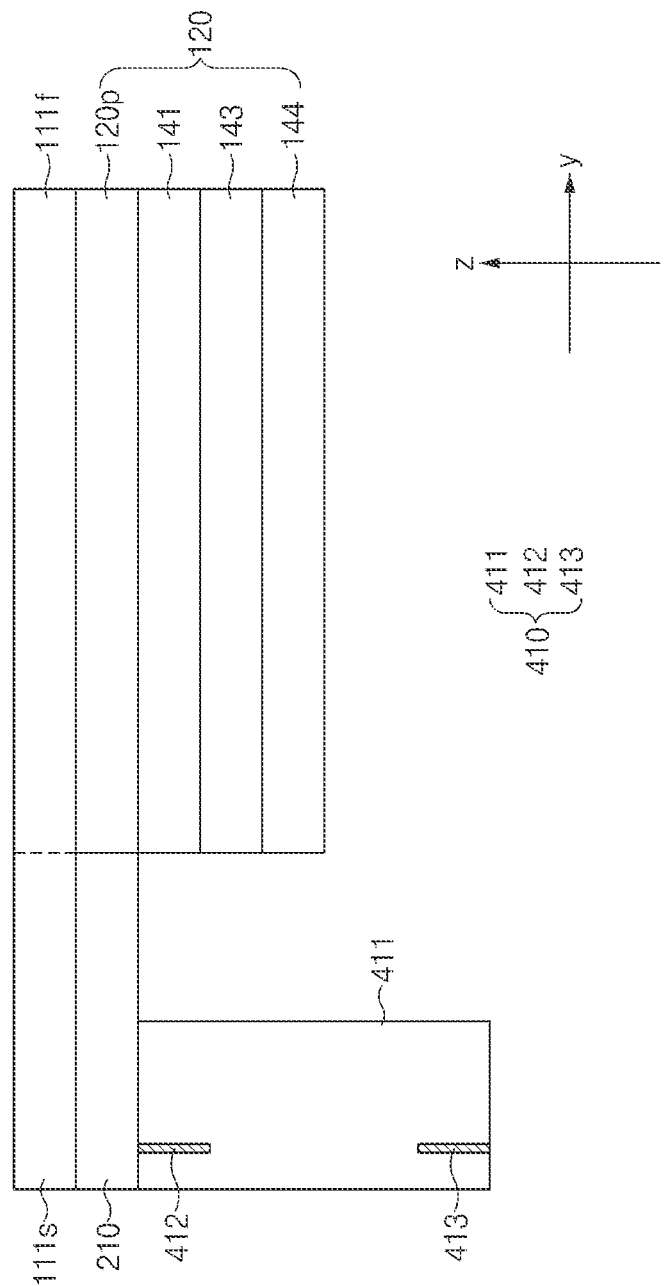
FIG. 4A is a sectional view illustrating an example antenna structure including an antenna array, according to an embodiment.
Figure 4B:
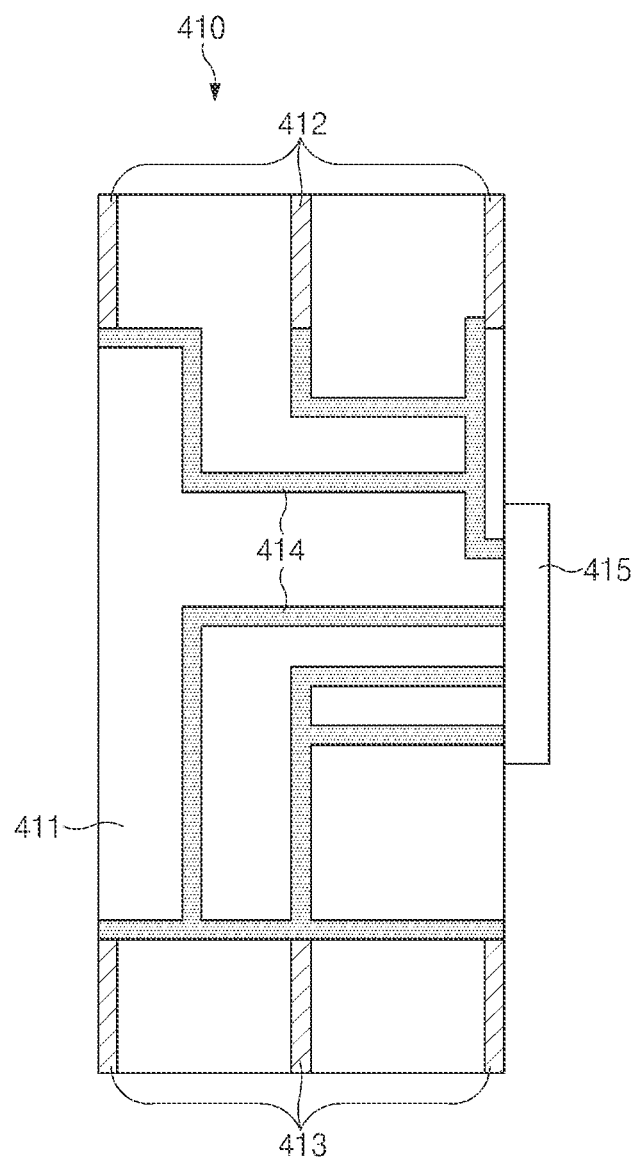
FIG. 4B a diagram illustrating an example antenna structure including an antenna array, according to an embodiment.
Figure 4C:
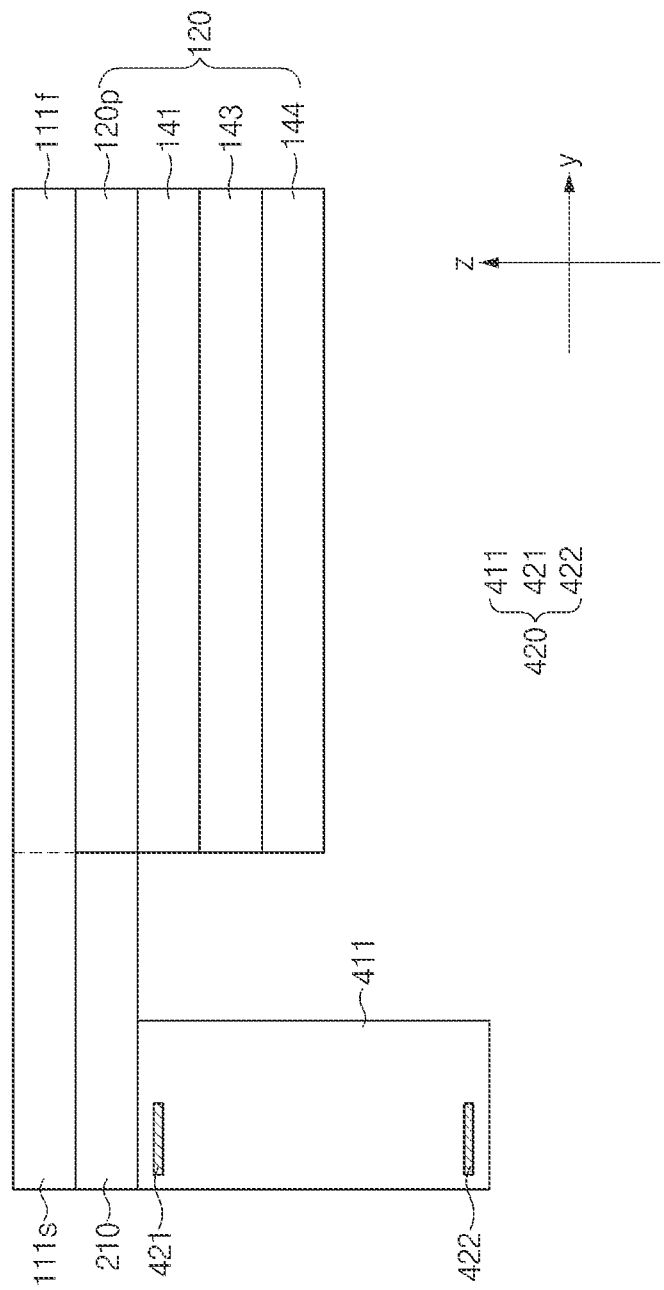
FIG. 4C is a sectional view illustrating an example antenna structure including an antenna array, according to another embodiment.

FIG. 4A is a sectional view illustrating an example antenna structure including an antenna array, according to an embodiment. FIG. 4B is a diagram illustrating an example antenna structure including an antenna array, according to an embodiment. FIG. 4C is a sectional view illustrating an example antenna structure including an antenna array, according to another embodiment.

Referring to FIG. 4A, an antenna structure 410 (e.g., the first antenna structure 130f or the second antenna structure 130s of FIG. 1) may include a printed circuit board 411 (or a first printed circuit board), a first antenna array 412, and a second antenna array 413. For example, each of the first antenna array 412 and the second antenna array 413 may include dipole antennas or patch antennas. In the case of FIG. 4A, the first antenna array 412 and the second antenna array 413 may form beams in the direction 'z' and the direction '-z', respectively. For example, the first antenna array 412 and the second antenna array 413 may substantially transmit and/or receive signals in the direction 'z' and the direction '-z', respectively.

Referring to FIG. 4B, the first antenna array 412 and the second antenna array 413 may include a plurality of dipole antennas. The plurality of dipole antennas may be electrically connected to a wireless communication circuit 415 through a feed line 414. The wireless communication circuit 415 may feed power to the first antenna array 412 and the second antenna array 413 through the feed line 414, and the first antenna array 412 and the second antenna array 413 may transmit and/or receive a signal in a specified frequency band.

Referring to FIG. 4C, the antenna structure 420 (e.g., the first antenna structure 130f or the second antenna structure 130s of FIG. 1) may include a first antenna array 421 and a second antenna array 422. For example, each of the first antenna array 412 and the second antenna array 413 may include dipole antennas or patch antennas. For example, the first antenna array 421 and the second antenna array 422 may form beams in the direction '-y'. For example, the first antenna array 421 and the second antenna array 422 may transmit and/or receive signals in the direction '-y'. Unlike the antenna structure 410 illustrated in FIG. 4A, in the antenna structure 420 illustrated in FIG. 4C, the intensity of a signal transmitted and received in the direction '-y' may be relatively stronger than the intensity of each of signals transmitted and received in the direction 'z' and the direction '-z', because the first antenna array 421 and the second antenna array 422 form beams in the direction '-y'.

Figure 5:
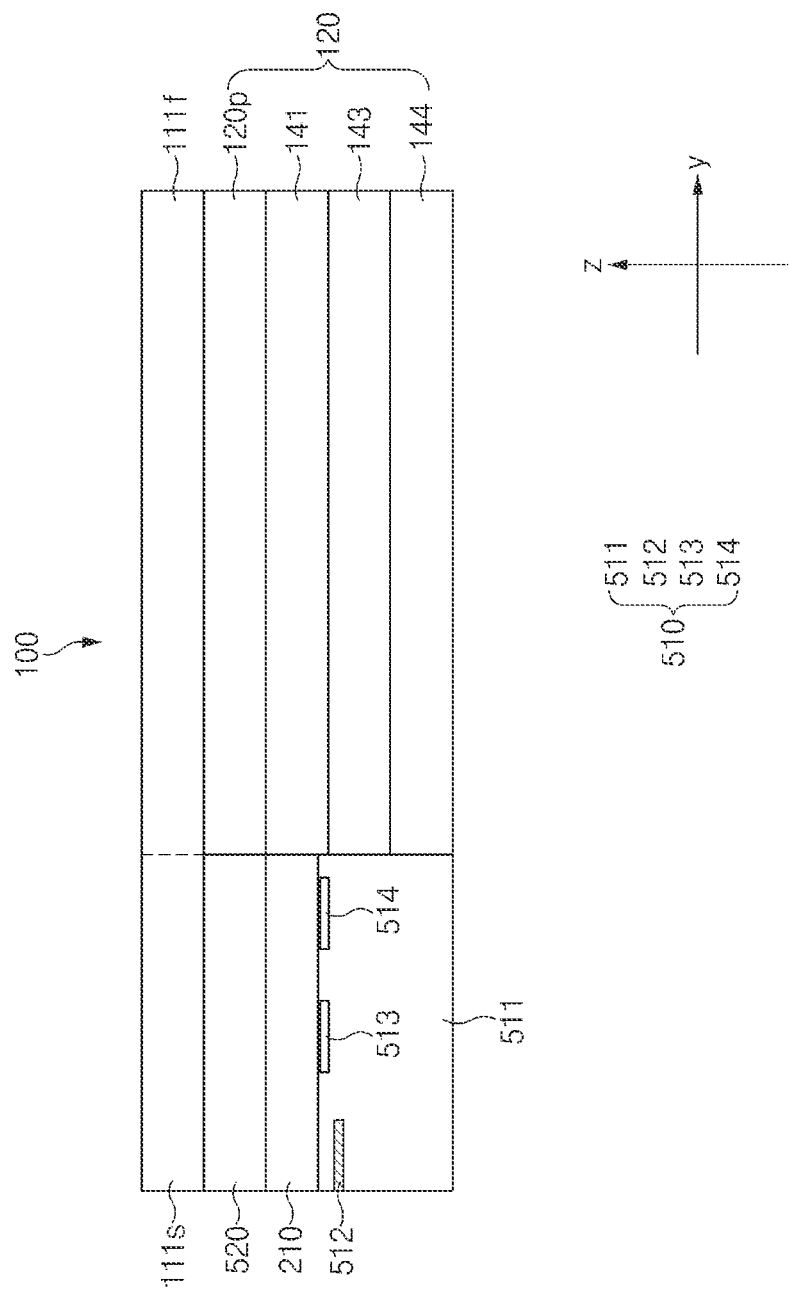
FIG. 5 is a sectional view illustrating an example electronic device in which an embossing layer is interposed between an antenna structure and a cover glass, according to an embodiment.

FIG. 5 is a sectional view illustrating an example electronic device in which an embossing layer is interposed between an antenna structure and a cover glass, according to an embodiment.

Referring to FIG. 5, the electronic device 100 may include an additional embossing layer 520 interposed between an antenna structure 510 (e.g., the first antenna structure 130f or the second antenna structure 130s of FIG. 1) and the second area 111s. The additional embossing layer 520 may protect the antenna structure 510 by absorbing external impact applied to the antenna structure 510.

According to an embodiment, the antenna structure 510 may include a first antenna array 512, a second antenna array 513, and a third antenna array 514. For example, the first antenna array 512 may include dipole antennas, and each of the second antenna array 513 and the third antenna array 514 may include of patch antennas. The first antenna array 512 may form a beam in the direction '-y', and the second antenna array 513 and the third antenna array 514 may form beams in the direction 'z'. For example, the first antenna array 512 may transmit and/or receive a signal in the direction '-y'. The second antenna array 513 and the third antenna array 514 may transmit and/or receive signals in the direction 'z'.

According to an embodiment, an electronic part (e.g., a fingerprint sensor, an illuminance sensor, or a camera) may be disposed in the direction '-z' of the antenna structure 510.

Figure 6A:
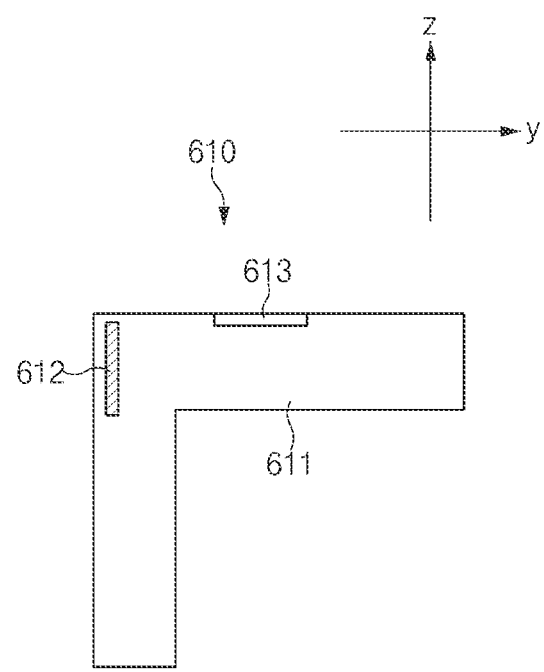
FIG. 6A is a sectional view illustrating an example inverted L-shaped antenna structure, according to an embodiment.
Figure 6B:
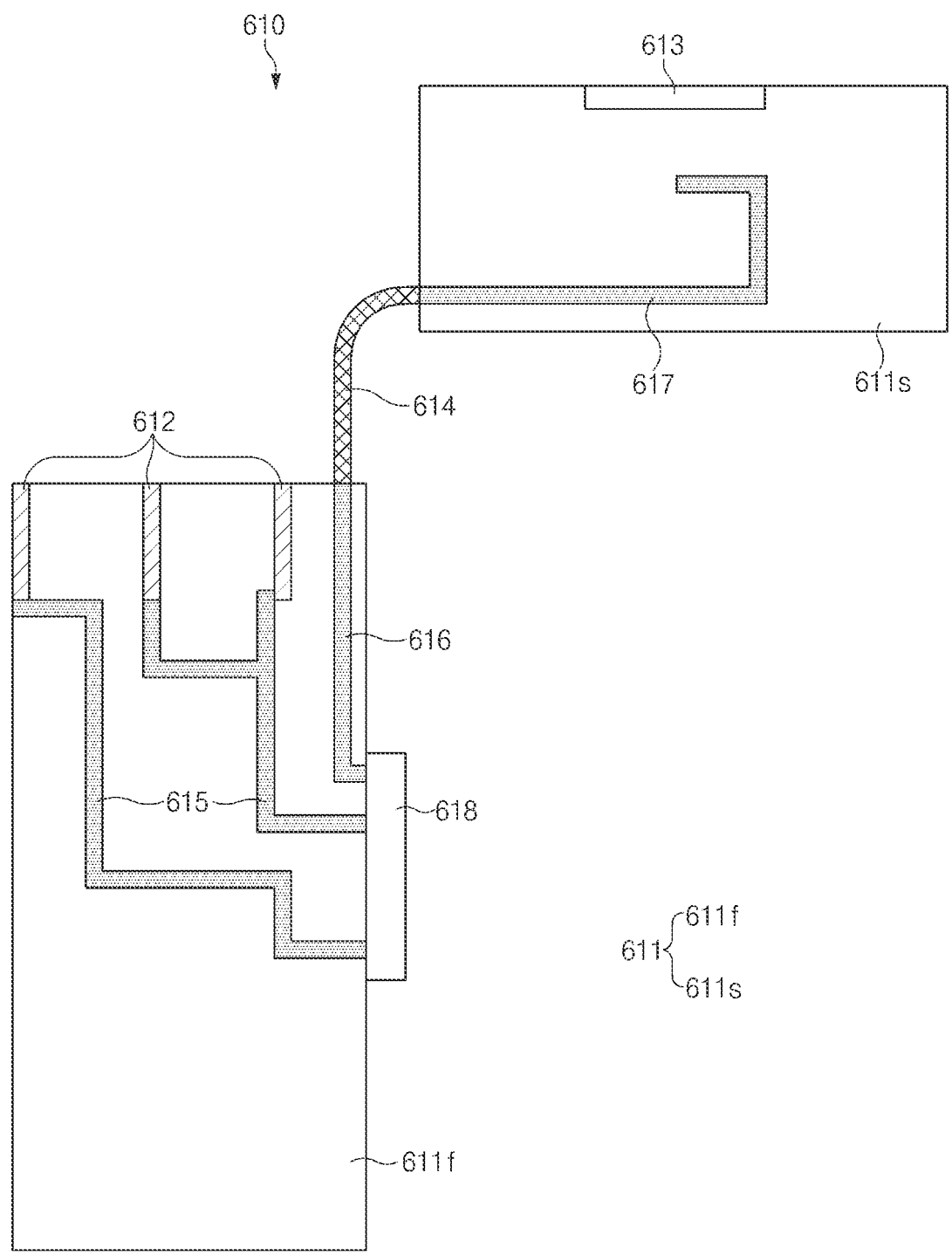
FIG. 6B is a diagram illustrating an example inverted L-shaped antenna structure, according to an embodiment.

FIG. 6A is a sectional view illustrating an example inverted L-shaped antenna structure, according to an embodiment. FIG. 6B is a diagram illustrating an example inverted L-shaped antenna structure, according to an embodiment.

Figure 6C:
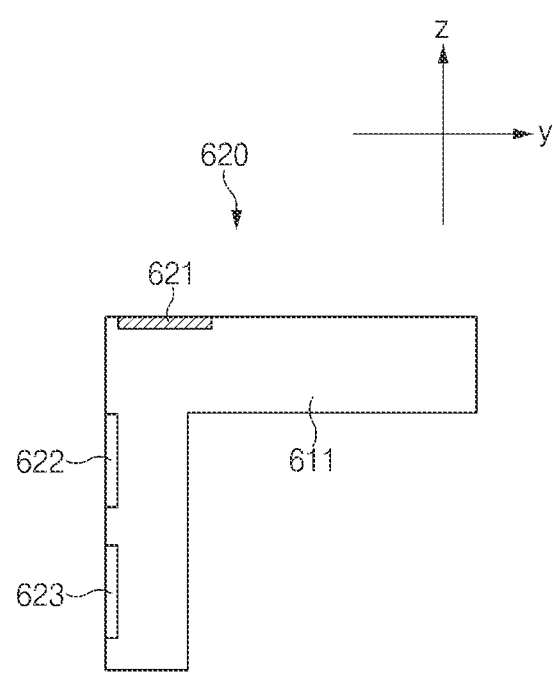
FIG. 6C is a sectional view illustrating an example inverted L-shaped antenna structure, according to another embodiment.
Figure 6D:
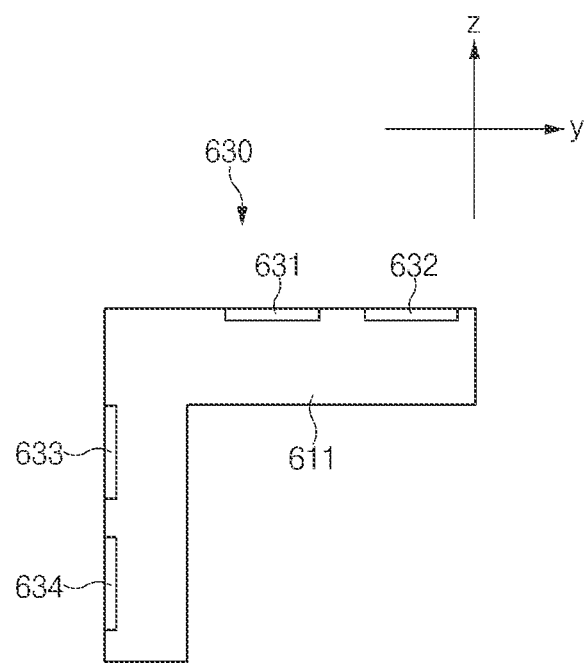
FIG. 6D is a sectional view illustrating an example inverted L-shaped antenna structure, according to still another embodiment.
Figure 6E:
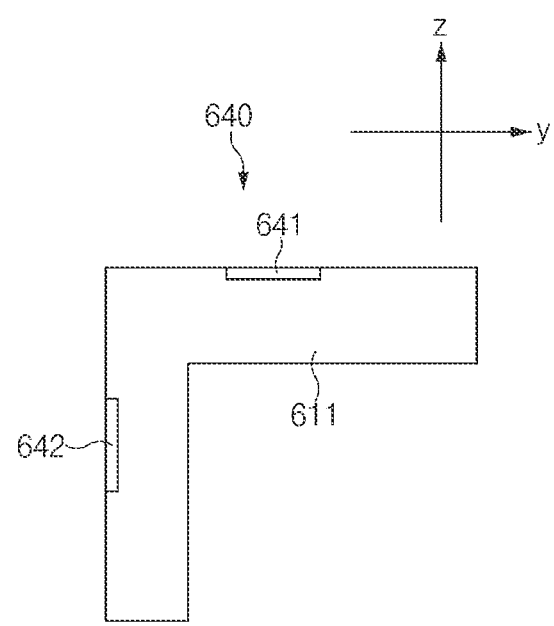
FIG. 6E is a sectional view illustrating an example inverted L-shaped antenna structure, according to yet another embodiment.

FIG. 6C is a sectional view illustrating an example inverted L-shaped antenna structure, according to another embodiment. FIG. 6D is a diagram illustrating an example inverted L-shaped antenna structure, according to still another embodiment. FIG. 6E is a sectional view illustrating an example inverted L-shaped antenna structure, according to yet another embodiment.

Referring to FIG. 6A, an antenna structure 610 (e.g., the first antenna structure 130f or the second antenna structure 130s of FIG. 1) may include a printed circuit board 611 (or a first printed circuit board), a first antenna array 612, and/or a second antenna array 613. A part of the printed circuit board 611 may extend in the direction 'y', and the remaining parts of the printed circuit board 611 may extend in the direction '-z'. The first antenna array 612 and the second antenna array 613 may form beams in the direction 'z'. For example, the first antenna array 612 and the second antenna array 613 may transmit and/or receive signals substantially in the direction 'z'.

Referring to FIG. 6B, the printed circuit board 611 may include a first printed circuit board 611f and a second printed circuit board 611s. The first printed circuit board 611f and the second printed circuit board 611s may be electrically connected to each other through a connection member 614 (e.g., a flexible printed circuit board (FPCB)).

According to an embodiment, the first antenna array 612 may be disposed on the first printed circuit board 611f. The first antenna array 612 may be electrically connected to a wireless communication circuit 618 through a first feed line 615. The wireless communication circuit 618 may transmit and/or receive a signal in a specified frequency band by feeding power the first antenna array 612 through the first feed line 615.

According to an embodiment, a second feed line 616 may be connected to a third feed line 617, which is disposed on the second printed circuit board 611s, through the connection member 614. The wireless communication circuit 618 may feed power directly to the second antenna array 613 through the second feed line 616, the connection member 614, and the third feed line 617. For another example, the wireless communication circuit 618 may transmit and/or receive a signal in a specified frequency band by indirectly feeding power to the second antenna array 613.

Referring to FIG. 6C, an antenna structure 620 (e.g., the first antenna structure 130f or the second antenna structure 130s of FIG. 1) may include a first antenna array 621, a second antenna array 622, and a third antenna array 623. For example, the first antenna array 621 may include dipole antennas, and the second antenna array 622 and/or the third antenna array 623 may include patch antennas. The first antenna array 621, the second antenna array 622, and the third antenna array 623 may form beams in the direction '−y'. For example, the first antenna array 621, the second antenna array 622, and the third antenna array 623 may transmit and/or receive signals in the direction '−y'.

Referring to FIG. 6D, an antenna structure 630 (e.g., the first antenna structure 130f or the second antenna structure 130s of FIG. 1) may include a first antenna array 631, a second antenna array 632, a third antenna array 633, and a fourth antenna array 634. For example, the first antenna array 631, the second antenna array 632, the third antenna array 633, or the fourth antenna array 634 may include patch antennas or dipole antennas. The first antenna array 631 and the second antenna array 632 may form beams in the direction 'z', and the third antenna array 633 and the fourth antenna array 634 may form beams in the direction '−y'. For example, the first antenna array 631 and the second antenna array 632 may transmit and/or receive signals in the direction 'z'. The third antenna array 633 and the fourth antenna array 634 may transmit and/or receive signals in the direction '−y'.

Referring to FIG. 6E, an antenna structure 640 (e.g., the first antenna structure 130f or the second antenna structure 130s of FIG. 1) may include a first antenna array 641 and a second antenna array 642. For example, the first antenna array 641 and/or the second antenna array 642 may include patch antennas or dipole antennas, respectively. The first antenna array 641 may form a beam in the direction 'z', and the second antenna array 642 may form a beam in the direction '−y'. For example, the first antenna array 641 may transmit and/or receive a signal in the direction 'z'. The second antenna array 642 may transmit and/or receive a signal in the direction '−y'.

Figure 7A:
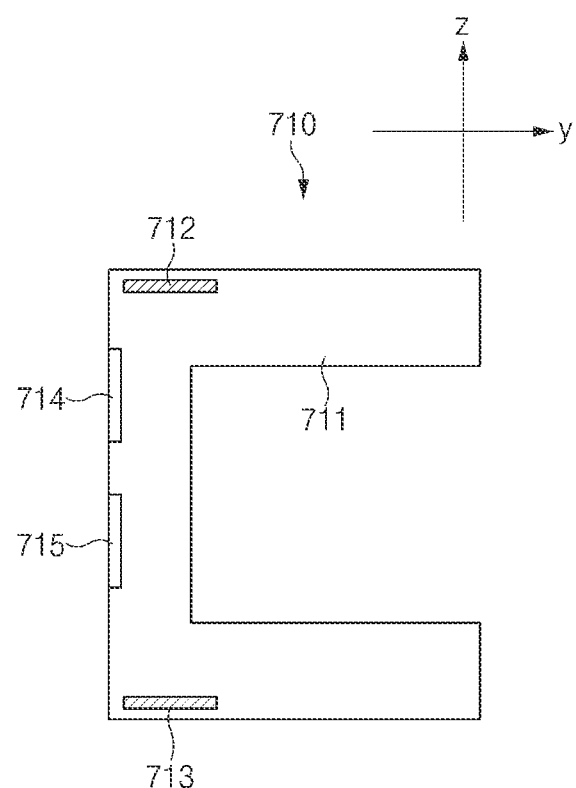
FIG. 7A is a sectional view illustrating an example U-shaped antenna structure, according to an embodiment.
Figure 7B:
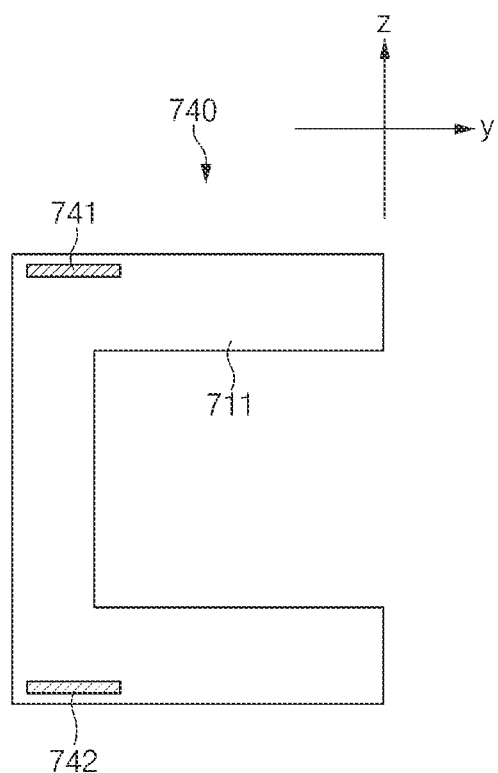
FIG. 7B is a sectional view illustrating an example U-shaped antenna structure, according to another embodiment.

FIG. 7A is a sectional view illustrating an example U-shaped antenna structure, according to an embodiment. FIG. 7B is a sectional view illustrating an example U-shaped antenna structure, according to another embodiment.

Referring to FIG. 7A, an antenna structure 710 (e.g., the first antenna structure 130f or the second antenna structure 130s of FIG. 1) may include a U-shaped printed circuit board 711 (or a first printed circuit board), a first antenna array 712, a second antenna array 713, a third antenna array 714, and a fourth antenna array 715, which are disposed on a printed circuit board 711. The first antenna array 712, the second antenna array 713, the third antenna array 714, and the fourth antenna array 715 may form beams in the direction '−y'. For example, the first antenna array 712, the second antenna array 713, the third antenna array 714, and the fourth antenna array 715 may transmit and/or receive signals in the direction '−y'.

Referring to FIG. 7B, an antenna structure 740 (e.g., the first antenna structure 130f or the second antenna structure 130s of FIG. 1) may include a first antenna array 741 and a second antenna array 742. For example, each of the first antenna array 741 and the second antenna array 742 may include dipole antennas or patch antennas. The first antenna array 741 and the second antenna array 742 may form beams in the direction '−y'. For example, the first antenna array 741 or the second antenna array 742 may transmit and/or receive a signal in the direction '−y'.

Figure 8A:
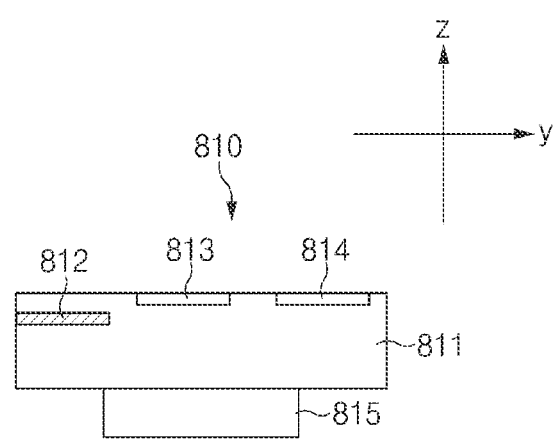
FIG. 8A is a diagram illustrating an example antenna structure including one wireless communication circuit, according to an embodiment.
Figure 8B:
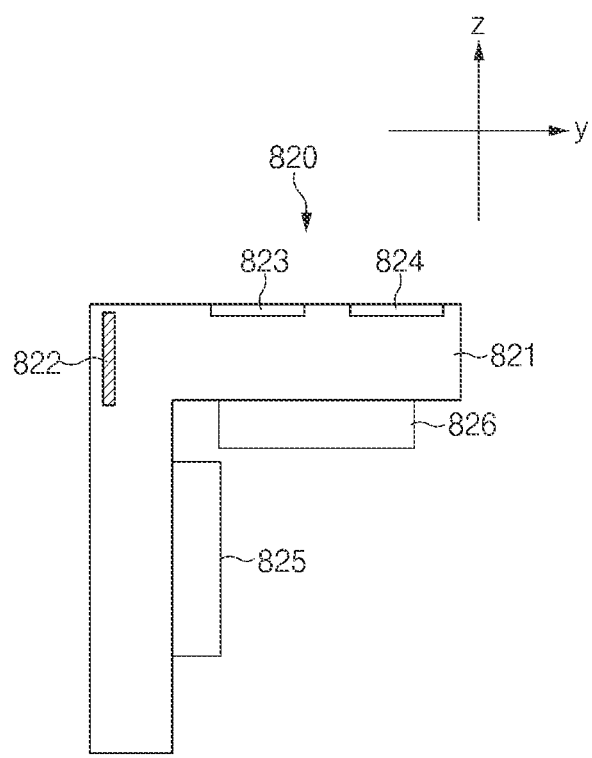
FIG. 8B is a diagram illustrating an example antenna structure including two wireless communication circuits, according to an embodiment.
Figure 8C:
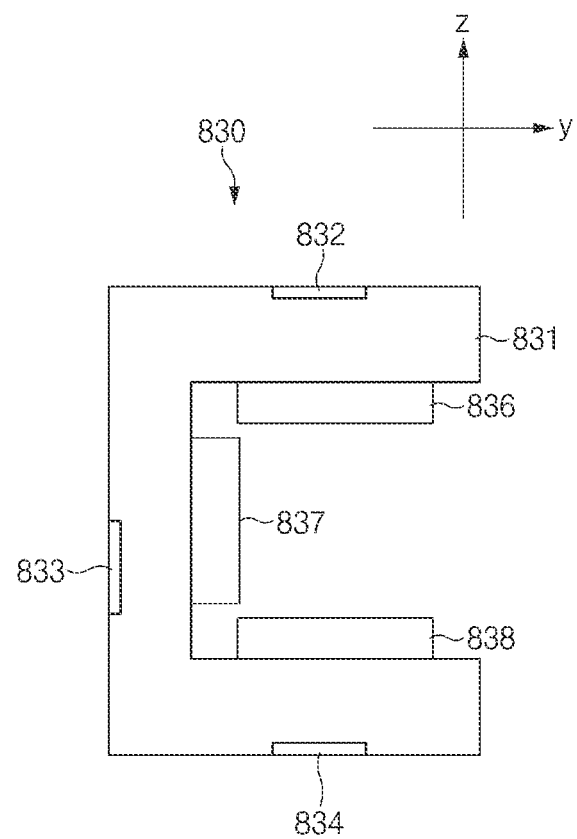
FIG. 8C is a diagram illustrating an example antenna structure including three wireless communication circuits, according to an embodiment.

FIG. 8A is a diagram illustrating an example antenna structure including a wireless communication circuit, according to an embodiment. FIG. 8B is a diagram illustrating an example antenna structure including two wireless communication circuits, according to an embodiment. FIG. 8C is a diagram illustrating an example antenna structure including three wireless communication circuits, according to an embodiment.

Referring to FIG. 8A, an antenna structure 810 (e.g., the first antenna structure 130f or the second antenna structure 130s of FIG. 1) may include a printed circuit board 811 (or a first printed circuit board), a first antenna array 812, a second antenna array 813, a third antenna array 814, and a wireless communication circuit 815. For example, the first antenna array 812 may include dipole antennas. The second antenna array 813 and/or the third antenna array 814 may include patch antennas. The first antenna array 812 may form a beam in the direction '−y'. The second antenna array 813 and the third antenna array 814 may form beams in the direction 'z'. The wireless communication circuit 815 may be electrically connected to the first antenna array 812, the second antenna array 813, and the third antenna array 814.

According to an embodiment, the wireless communication circuit 815 may transmit and/or receive a signal in a specified frequency band by feeding power to the first antenna array 812, the second antenna array 813, and the third antenna array 814. For example, the wireless communication circuit 815 may transmit and/or receive a signal in a frequency range of 3 GHz to 100 GHz by feeding power to the first antenna array 812.

Referring to FIG. 8B, an antenna structure 820 (e.g., the first antenna structure 130f or the second antenna structure 130s of FIG. 1) may include an inverted L-shaped printed circuit board 821 (or a first printed circuit board), a first antenna array 822, a second antenna array 823, a third antenna array 824, a first wireless communication circuit 825, and a second wireless communication circuit 826. For example, the first antenna array 822 may include dipole antennas. The second antenna array 823 and/or the third antenna array 824 may include patch antennas. The first antenna array 822, the second antenna array 823, and the third antenna array 824 may form beams in the direction 'z'. The first wireless communication circuit 825 may be electrically connected to the first antenna array 822, and the second wireless communication circuit 826 may be electrically connected to the second antenna array 823 and the third antenna array 824.

According to an embodiment, the first wireless communication circuit 825 may transmit and/or receive a signal in a specified frequency band by feeding power to the first antenna array 822. The second wireless communication circuit 826 may transmit and/or receive a signal in a specified frequency band by feeding power to the second antenna array 823 and the third antenna array 824. For example, the first wireless communication circuit 825 may transmit and/or receive a signal in a frequency range of 3 GHz to 100 GHz by feeding power to the first antenna array 822.

Referring to FIG. 8C, an antenna structure 830 (e.g., the first antenna structure 130f or the second antenna structure 130s of FIG. 1) may include a U-shaped printed circuit board 831 (or a first printed circuit board), a first antenna array 832, a second antenna array 833, a third antenna array 834, a first wireless communication circuit 836, a second wireless communication circuit 837, and/or a third wireless communication circuit 838. For example, each of the first antenna array 832, the second antenna array 833, and the third antenna array 834 may include patch antennas or dipole antennas. The first antenna array 832, the second antenna array 833, and the third antenna array 834 may form beams in the direction 'z', the direction '–y', and the direction '–z', respectively.

According to an embodiment, the first wireless communication circuit 836 may be electrically connected to the first antenna array 832, and the second wireless communication circuit 837 may be electrically connected to the second antenna array 833. The third wireless communication circuit 838 may be electrically connected to the third antenna array 834. According to an embodiment, the first wireless communication circuit 836 may transmit and/or receive a signal in a specified frequency band by feeding power to the first antenna array 832. The second wireless communication circuit 837 may transmit and/or receive a signal in a specified frequency band by feeding power to the second antenna array 833. The third wireless communication circuit 838 may transmit and/or receive a signal in a specified frequency band by feeding power to the third antenna array 834. For example, the first wireless communication circuit 836 may transmit and/or receive a signal in a frequency range of 3 GHz to 100 GHz by feeding power to the first antenna array 832.

Figure 9A:
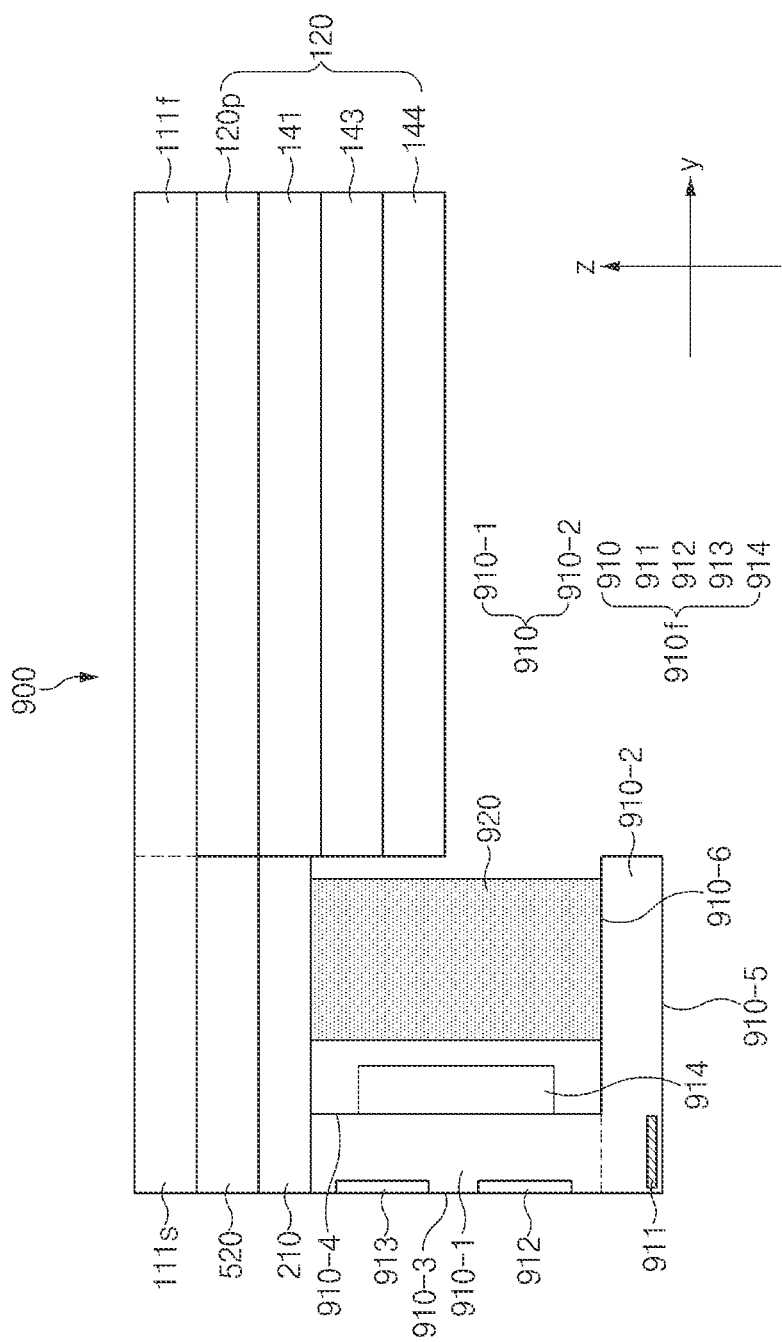
FIG. 9A is a sectional view illustrating an example electronic device including an electronic part interposed between an antenna structure and a display, according to an embodiment.
Figure 9B:
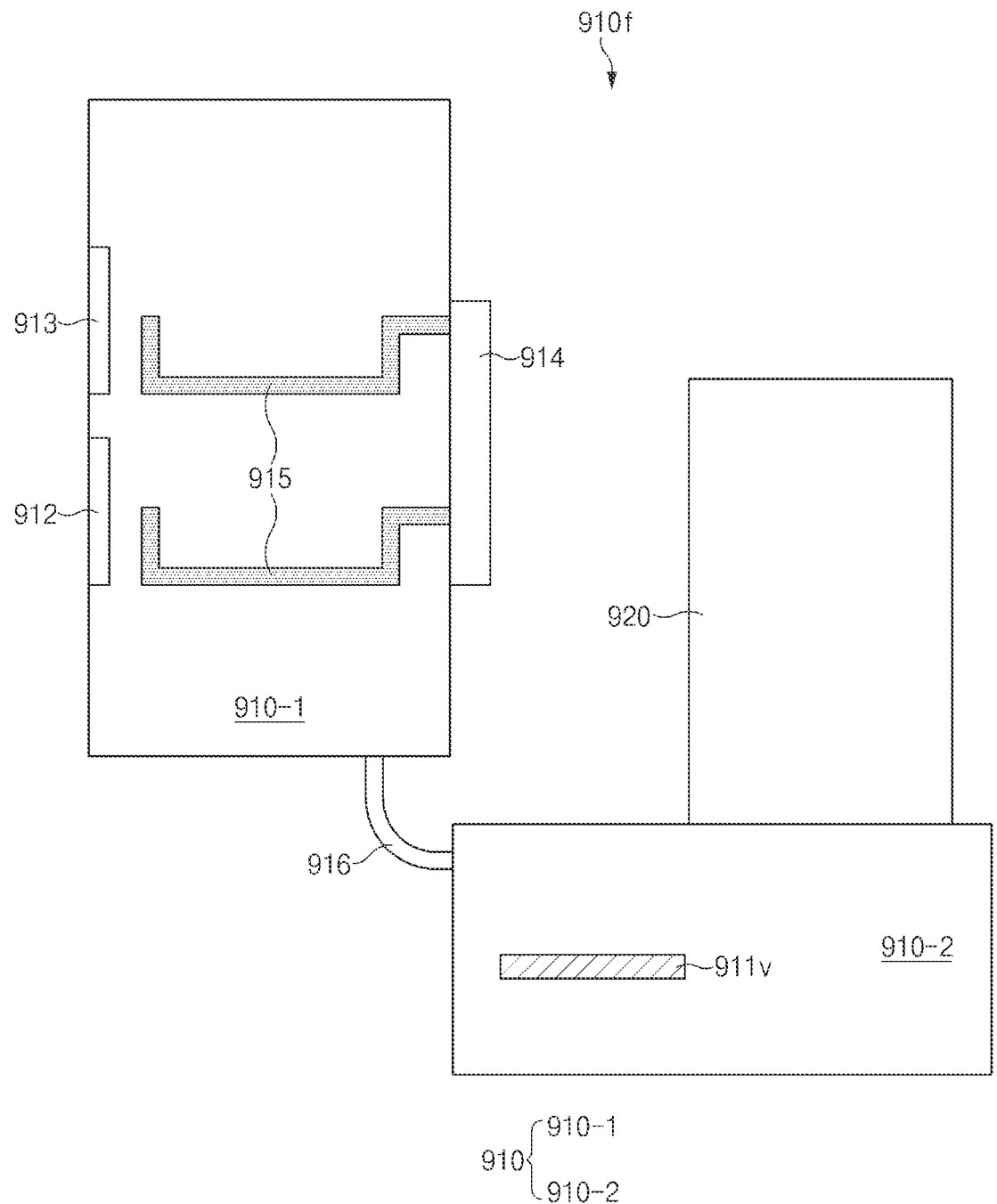
FIG. 9B is a diagram illustrating an example antenna structure and an electronic part, according to an embodiment.

FIG. 9A is a sectional view illustrating an example electronic device including an electronic part interposed between an antenna structure and a display, according to an embodiment. FIG. 9B is a diagram illustrating an example antenna structure and an electronic part, according to an embodiment.

The details about the display 120 and the adhesive member 210 illustrated in FIG. 2A and the additional embossing layer 520 illustrated in FIG. 5 may be applied to FIG. 9A.

Referring to FIG. 9A, an antenna structure 910f (e.g., the first antenna structure 130f or the second antenna structure 130s of FIG. 1) may include an L-shaped printed circuit board 910, a first antenna array 911, a second antenna array 912, a third antenna array 913, and a wireless communication circuit 914. For example, the first antenna array 911 may include dipole antennas, and the second antenna array 912 and/or the third antenna array 913 may include patch antennas. The first antenna array 911, the second antenna array 912, and the third antenna array 913 may form beams in the direction '–y'. The wireless communication circuit 914 may be electrically connected to the first antenna array 911, the second antenna array 912, and the third antenna array 913. The wireless communication circuit 914 may transmit and/or receive a signal in a specified frequency band by feeding power to the first antenna array 911, the second antenna array 912, and the third antenna array 913.

According to an embodiment, the printed circuit board 910 may include a first structure 910-1 and a second structure 910-2. The first structure 910-1 may include a first surface 910-3 facing a side member (e.g., the side member 112 of FIG. 1) and a second surface 910-4 that faces a direction facing away from the first surface 910-3. The second structure 910-2 may be bent from the first structure 910-1 and may include a third surface 910-5 facing the second plate (e.g., 113 in FIG. 1) and a fourth surface 910-6 facing the first plate (e.g., 111 in FIG. 1).

According to an embodiment, the L-shaped printed circuit board 910 may substantially surround an electronic part 920. For example, the electronic part 920 may be, for example, and without limitation, a proximity sensor, a camera module, a receiver, an iris sensor, an illuminance sensor, or the like. For example, when the electronic part 920 is a proximity sensor, the electronic part 920 may determine whether the user approaches the electronic device 100. According to an embodiment of the present disclosure, the electronic part 920 may be mounted between the L-shaped printed circuit board 910 and the display 120.

Referring to FIG. 9B, the printed circuit board 910 may include the first structure 910-1 and the second structure 910-2. The first structure 910-1 and the second structure 910-2 may be connected to each other through a connection member 916 (e.g., FPCB).

According to an embodiment, the second antenna array 912, the third antenna array 913, a feed line 915, and the wireless communication circuit 914 may be disposed in the first structure 910-1. The wireless communication circuit 914 may transmit and/or receive a signal in a specified frequency band by feeding power to the second antenna array 912 and the third antenna array 913 directly or indirectly.

According to an embodiment, a via 911v and the electronic part 920 may be disposed in or on the second structure 910-2. The via 911v may be used as the first antenna array 911. For example, the wireless communication circuit 914 may feed power to the via 911v through the connection member 916, and the wireless communication circuit 914 may transmit and/or receive a signal in a specified frequency band through the via 911v.

Figure 10A:
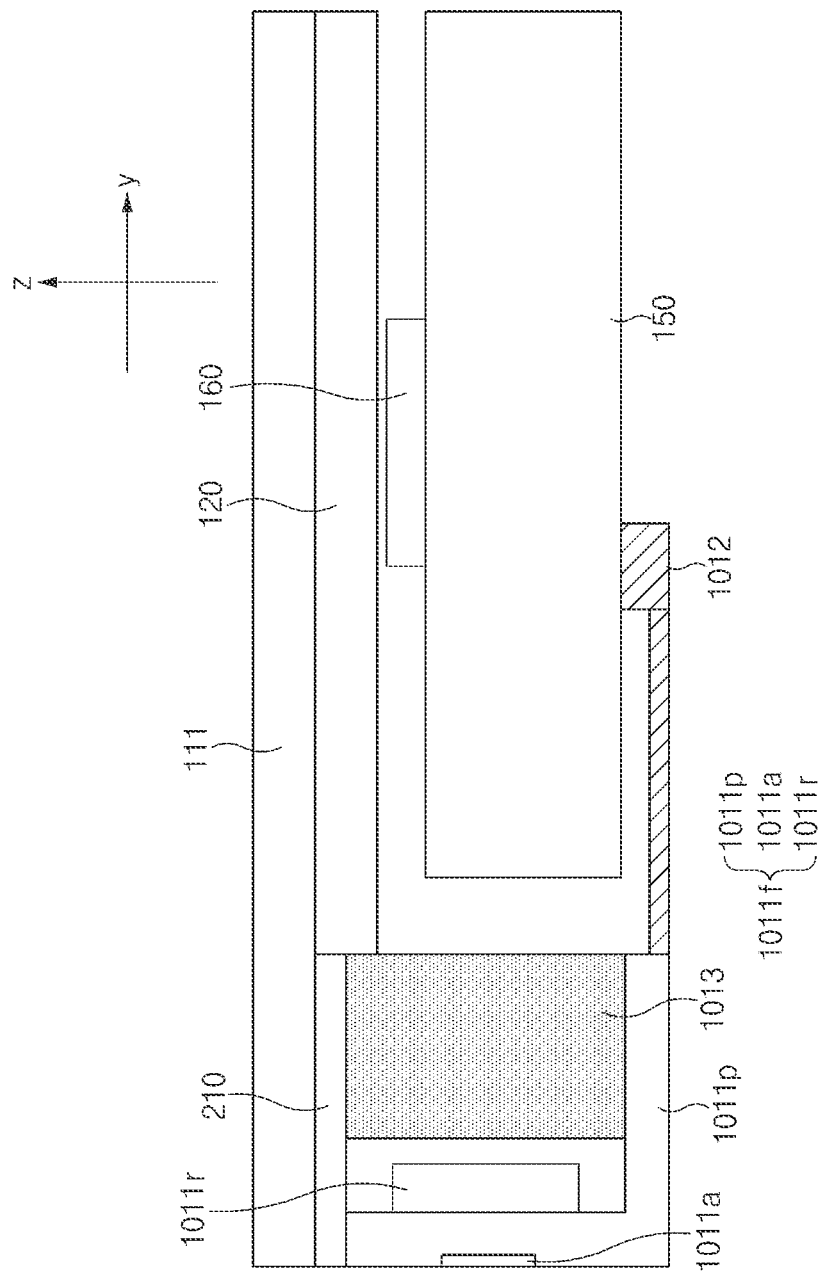
FIG. 10A is a sectional view illustrating an example electronic device in which a first printed circuit board and a second printed circuit board are connected to each other, according to an embodiment.
Figure 10C:
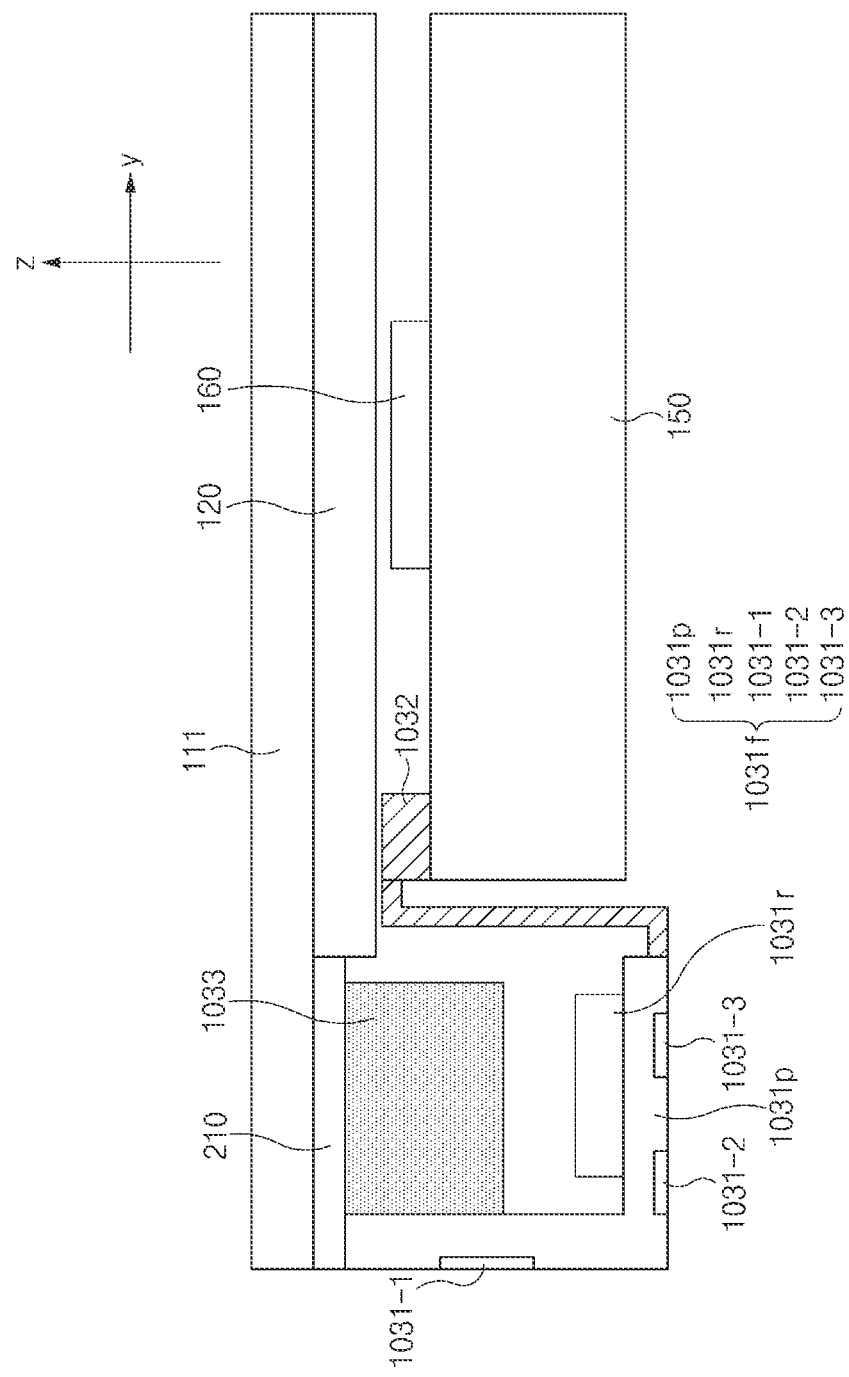
FIG. 10C is a sectional view illustrating an example electronic device in which a first printed circuit board and a second printed circuit board are connected to each other, according to still another embodiment.

FIG. 10A is a sectional view illustrating an example electronic device in which a first printed circuit board and a second printed circuit board are connected to each other, according to an embodiment. FIG. 10B is a sectional view illustrating an example electronic device in which a first printed circuit board and a second printed circuit board are connected to each other, according to another embodiment. FIG. 10C is a sectional view illustrating an example electronic device in which a first printed circuit board and a second printed circuit board are connected to each other, according to still another embodiment.

Referring to FIG. 10A, an antenna structure 1011f (e.g., the first antenna structure 130f or the second antenna structure 130s of FIG. 1) may include a first printed circuit board 1011p. One end of the first printed circuit board 1011p may be attached to a bezel area of the cover glass 111 through the adhesive member 210, and the other end of the first printed circuit board 1011p may be connected to the second printed circuit board 150 through a connection member 1012.

According to an embodiment, the connection member 1012 may be connected to a surface facing the direction '–z' of the second printed circuit board 150. The processor 160 disposed on the second printed circuit board 150 may control an antenna structure 1011f and/or an electronic part 1013 through the connection member 1012. For example, the processor 160 may control a wireless communication circuit 1011r to feed power to an antenna array 1011a or may control the electronic part 1013 to emit light in the infrared band. For example, the connection member 1012 may include an FPCB.

Referring to FIG. 10B, one end of a connection member 1022 may be connected to a first printed circuit board 1021p, and the other end of the connection member 1022 may be connected to a surface facing the direction 'z' of the second printed circuit board 150.

According to an embodiment, an electronic part 1023 and a wireless communication circuit 1021r may be interposed between the first printed circuit board 1021p and the second printed circuit board 150 in the direction 'y', in parallel. The processor 160 disposed on the second printed circuit board 150 may control an antenna structure 1021f (e.g., the first antenna structure 130*f* or the second antenna structure 130*s* of FIG. 1) and/or the electronic part 1023 through the connection member 1022.

According to an embodiment, the antenna structure 1021*f* may include a first antenna array 1021-1, a second antenna array 1021-2, and a third antenna array 1021-3. The first antenna array 1021-1, the second antenna array 1021-2, and the third antenna array 1021-3 may include patch antennas or dipole antennas.

Referring to FIG. 10C, one end of a connection member 1032 may be connected to a first printed circuit board 1031*p*, and the other end of the connection member 1032 may be connected to a surface facing the direction 'z' of the second printed circuit board 150.

According to an embodiment, an electronic part 1033 and a wireless communication circuit 1031*r* may be interposed between the first printed circuit board 1031*p* and the second printed circuit board 150 in the direction 'z', in parallel. The processor 160 disposed on the second printed circuit board 150 may control an antenna structure 1031*f* (e.g., the first antenna structure 130*f* or the second antenna structure 130*s* of FIG. 1) and/or the electronic part 1033 through the connection member 1032.

According to an embodiment, a signal for controlling the wireless communication circuit 1031*r* and electronic part 1033 may be transmitted through the connection member 1032. For example, the processor 160 may control the wireless communication circuit 1031*r* and the electronic part 1033 through the connection member 1032.

According to an embodiment, the antenna structure 1031*f* may include a first antenna array 1031-1, a second antenna array 1031-2, and a third antenna array 1031-3. The first antenna array 1031-1, the second antenna array 1031-2, and the third antenna array 1031-3 may include patch antennas or dipole antennas.

Figure 11A:
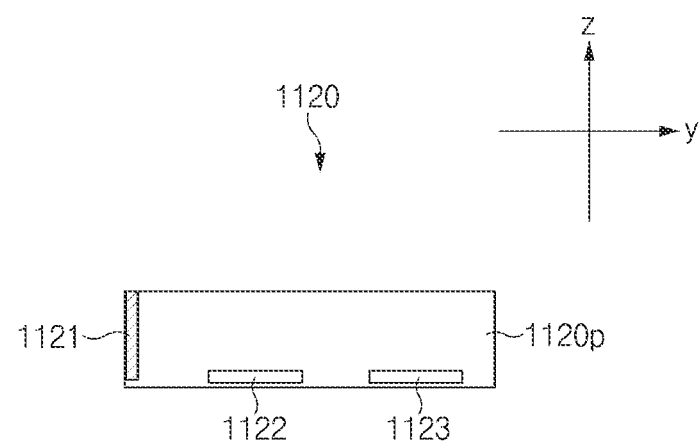
FIG. 11A is a sectional view illustrating an example I-shaped antenna structure, according to an embodiment.
Figure 11B:
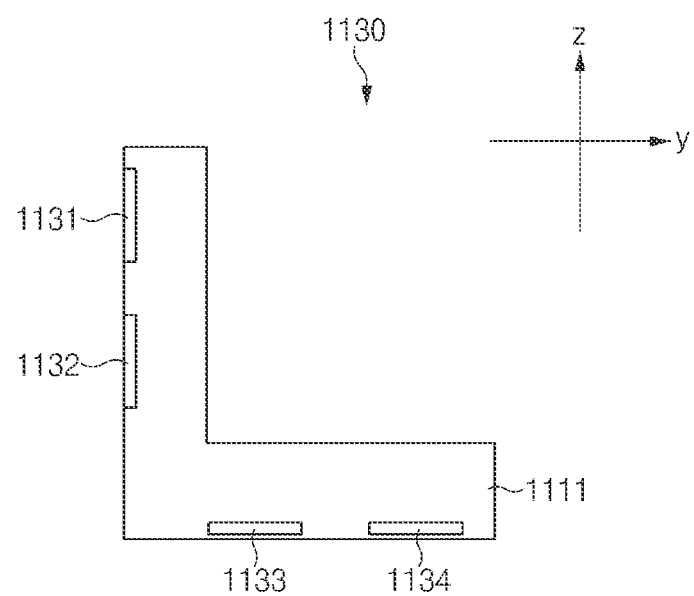
FIG. 11B is a sectional view illustrating an example L-shaped antenna structure, according to an embodiment.
Figure 11C:
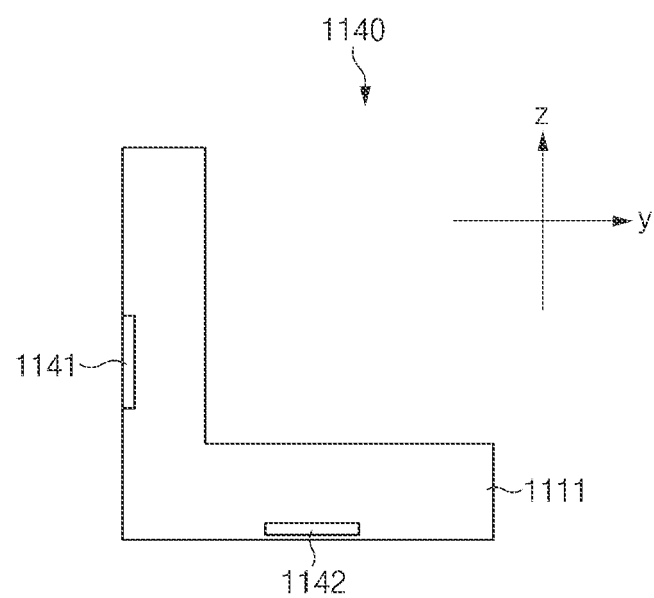
FIG. 11C is a sectional view illustrating an example L-shaped antenna structure, according to another embodiment.

FIG. 11A is a sectional view illustrating an example I-shaped antenna structure, according to an embodiment. FIG. 11B is a sectional view illustrating an example L-shaped antenna structure, according to an embodiment. FIG. 11C is a sectional view illustrating an example L-shaped antenna structure, according to another embodiment. The antenna structure illustrated in FIGS. 11A, 11B and 11C may be mounted in an electronic device 900 illustrated in FIG. 9A.

Referring to FIG. 11A, an antenna structure 1120 (e.g., the first antenna structure 130*f* or the second antenna structure 130*s* of FIG. 1) may include a printed circuit board 1120*p*, a first antenna array 1121, a second antenna array 1122, and a third antenna array 1123. For example, the printed circuit board 1120*p* may be a planar shape, and the via 1121 formed in the printed circuit board 1120 may be used as the first antenna array 1121. For another example, the first antenna array 1121 may include dipole antennas, and the second antenna array 1122 and/or the third antenna array 1123 may include patch antennas. The first antenna array 1121, the second antenna array 1122, and the third antenna array 1123 may form beams in the direction '–z'. For example, the first antenna array 1121, the second antenna array 1122, and the third antenna array 1123 may transmit and/or receive signals in the direction '–z'.

Referring to FIG. 11B, an antenna structure 1130 (e.g., the first antenna structure 130*f* or the second antenna structure 130*s* of FIG. 1) may include a printed circuit board 1111, a first antenna array 1131, a second antenna array 1132, a third antenna array 1133, and a fourth antenna array 1134. For example, each of the first antenna array 1131, the second antenna array 1132, the third antenna array 1133, and the fourth antenna array 1134 may include patch antennas or dipole antennas. The first antenna array 1131 and the second antenna array 1132 may form beams in the direction '–y', and the third antenna array 1133 and the fourth antenna array 1134 may form beams in the direction '–z'. For example, the first antenna array 1131 and the second antenna array 1132 may transmit and/or receive signals in the direction '–y', and the third antenna array 1133 and the fourth antenna array 1134 may transmit and/or receive signals in the direction '–z'.

Referring to FIG. 11C, an antenna structure 1140 (e.g., the first antenna structure 130*f* or the second antenna structure 130*s* of FIG. 1) may include the printed circuit board 1111, a first antenna array 1141, and a second antenna array 1142. For example, each of the first antenna array 1141 and the second antenna array 1142 may include patch antennas or dipole antennas. The first antenna array 1141 may form a beam in the direction '–y', and the second antenna array 1142 may form a beam in the direction '–z'. For example, the first antenna array 1141 may transmit and/or receive a signal in the direction '–y'. The second antenna array 1142 may transmit and/or receive a signal in the direction '–z'.

Figure 12A:
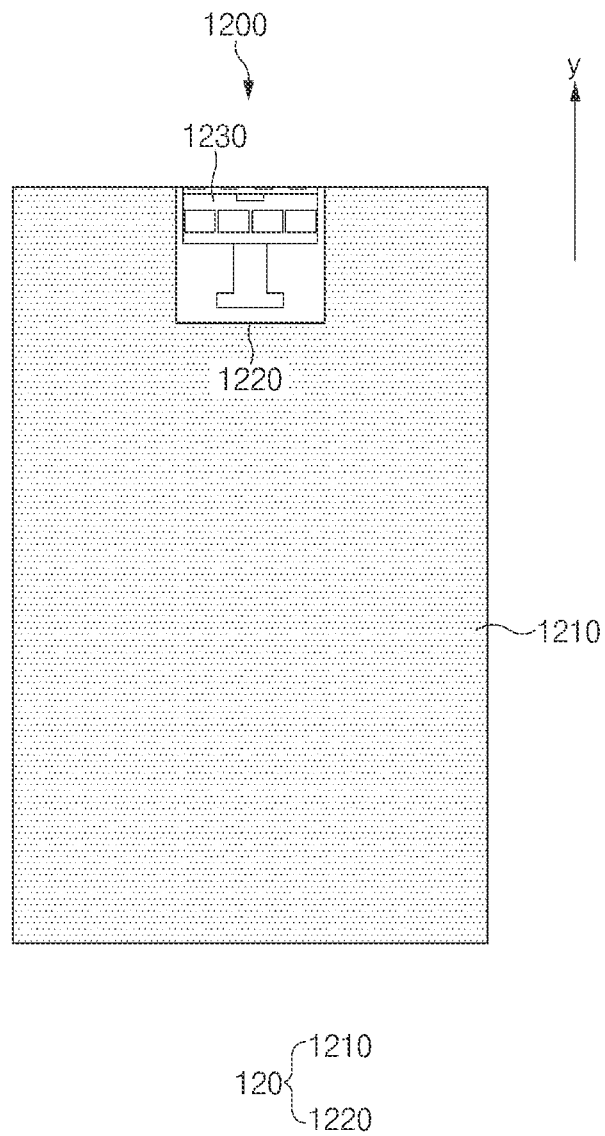
FIG. 12A is a diagram illustrating an example electronic device in which an antenna structure including a plurality of electronic parts is mounted, according to an embodiment.
Figure 12B:
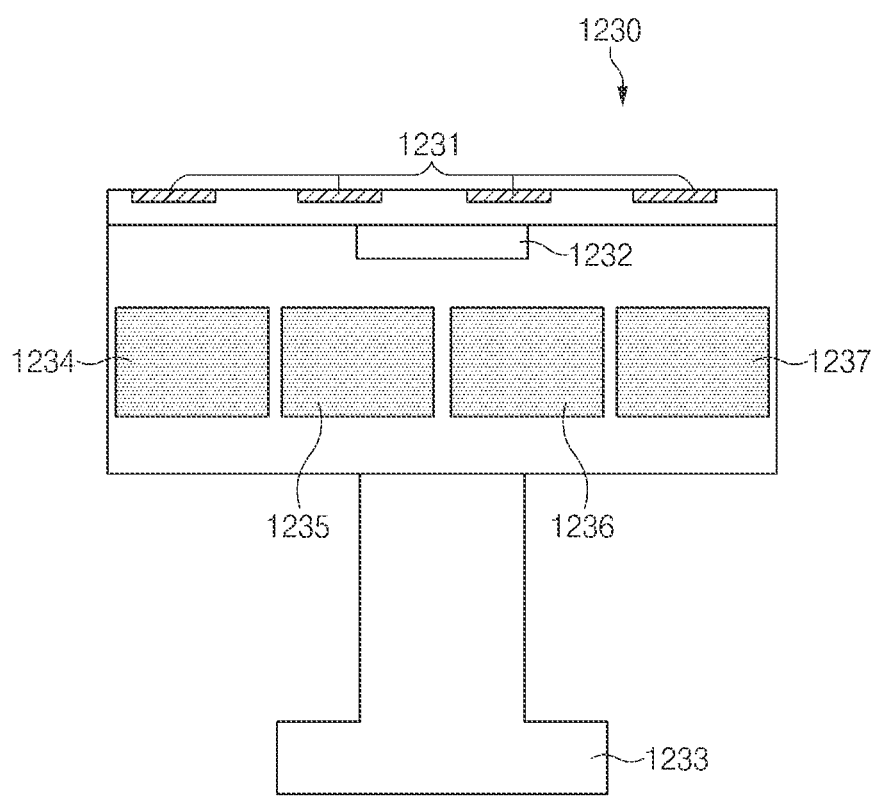
FIG. 12B is a diagram illustrating an enlarged view of an example antenna structure, according to an embodiment.
Figure 12C:
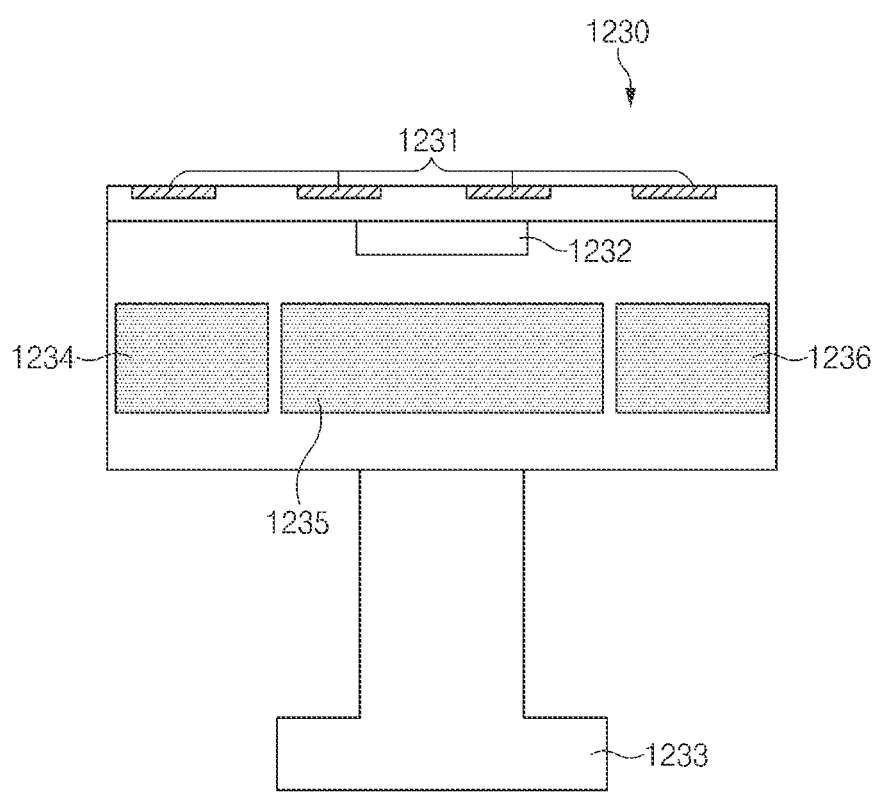
FIG. 12C is a diagram illustrating an enlarged view of an example antenna structure, according to another embodiment.

FIG. 12A is a diagram illustrating an example electronic device in which an antenna structure including a plurality of electronic parts is mounted, according to an embodiment. FIG. 12B is a diagram illustrating an enlarged view of an example antenna structure, according to an embodiment. FIG. 12C is a diagram illustrating an enlarged view of an example antenna structure, according to another embodiment. The antenna structure illustrated in FIGS. 12B and 12C illustrates the enlarged view of an antenna structure 1230 illustrated in FIG. 12A.

Referring to FIG. 12A, an electronic device 1200 may include the display 120 and the antenna structure 1230.

According to an embodiment, the display 120 may include an activation area 1210 and a deactivation area 1220. At least one pixel may be disposed in the activation area 1210, and various pieces of content (e.g., a photo or a video) may be output. The deactivation area 1220 may be an area where a part of the activation area 1210 is removed, and may have, for example, a 'U' shape. The antenna structure 1230 may be disposed in the deactivation area 1220.

Referring to FIGS. 12B and 12C, the antenna structure 1230 (e.g., the first antenna structure 130*f* or the second antenna structure 130*s* of FIG. 1) may include an antenna array 1231, a wireless communication circuit 1232, a connection member 1233, and a plurality of electronic parts 1234, 1235, 1236, and 1237. The wireless communication circuit 1232 may transmit and/or receive a signal in a specified frequency band by feeding power to the antenna array 1231. The connection member 1233 may connect the second printed circuit board 150 to the antenna structure 1230. The processor 160 disposed on the second printed circuit board 150 may control the plurality of electronic parts 1234, 1235, 1236, and 1237. For example, when the first electronic part 1234 is a proximity sensor, the second electronic part 1235 is a receiver, the third electronic part 1236 is a camera, and when the fourth electronic part 1237 is an illuminance sensor, the processor 160 may control the first electronic part 1234 to sense whether a user approaches the electronic device 1200. The processor 160 may control the second electronic part 1235 so that the voice of another user is output while a user makes a call and may control the third electronic part 1236 to capture a photo or a video in response to a user input. The processor 160 may also control the fourth electronic part 1237 to measure an external illumination value.

According to an embodiment of the present disclosure, an electronic device 100 may include housing 110 including a first plate 111 including a glass plate, a second plate 113 facing the first plate 111, and a side member (e.g., side face or side surface) 112 surrounding a space between the first plate 111 and the second plate 113, a display 120 disposed inside the space and exposed through a first area 111*f* of the first plate 111, an antenna structure 910*f* (e.g., the antenna structure 910*f* of FIG. 9A) which at least partially overlaps a second area 111*s* of the first plate 111 when viewed from above the first plate 111 and which is connected to the second area 111*s*, a printed circuit board 910 (e.g., the printed circuit board 910 of FIG. 9A) disposed in parallel to the first plate 111, disposed inside the space and electrically connected to the wireless communication circuit, and a processor 160 disposed on the printed circuit board 910 and connected to the display 120. The antenna structure 910*f* may include a first structure 910-1 including a first surface facing the side member 112 and a second surface facing away from the side member 112, a first array (e.g., the second antenna 912 of FIG. 9A and the third antenna 913 of FIG. 9A) of conductive patterns formed on the first surface or between the first surface and the second surface and a wireless communication circuit 914 (e.g., the wireless communication circuit 914 of FIG. 9A), which is attached to the antenna structure 910*f* or formed on the antenna structure 910*f*, which is electrically connected to the first array, and which is configured to transmit and/or receive a signal in a frequency range of 3 GHz to 100 GHz.

According to an embodiment of the present disclosure, the display 120 may include an embossing layer 141 extending from the first area 111*f* to at least part of the second area 111*s*, and the antenna structure 910*f* may be connected to the embossing layer 141.

According to an embodiment of the present disclosure, the antenna structure 910*f* may be attached to the embossing layer 141 through an adhesive layer 210.

According to an embodiment of the present disclosure, the display 120 may include an organic light emitting diode layer interposed between the embossing layer 141 and the first plate 111, a conductive layer 143 interposed between the embossing layer 141 and the printed circuit board 910, and a heat insulating layer 144 interposed between the conductive layer 143 and the printed circuit board 910.

According to an embodiment of the present disclosure, the wireless communication circuit 914 may be attached to the second surface or is formed on the second surface.

According to an embodiment of the present disclosure, the antenna structure 910*f* may include a third surface facing the second plate 113 and a fourth surface facing the first plate 111, and the antenna structure 910*f* may further include a second structure 910-2 bent from the first structure.

According to an embodiment of the present disclosure, the wireless communication circuit 914 may be attached to the fourth surface or is formed on the fourth surface.

According to an embodiment of the present disclosure, the antenna structure 910*f* may further include a second array (e.g., the first antenna array 911 of FIG. 9A) of conductive patterns formed on the third surface or formed between the third surface and the fourth surface, and the wireless communication circuit 914 may be electrically connected to the second array 911.

According to an embodiment of the present disclosure, the electronic device 100 may further include an electronic element (e.g., the electronic part 920 of FIG. 9A) attached to the antenna structure 910*f*. The electronic element may include at least one of a camera, a speaker, a light emitting diode, an infrared sensor, a microphone, or a proximity sensor.

According to an embodiment of the present disclosure, the electronic device 100 may further include a flexible member (e.g., the connection member 1012 of FIG. 10A) electrically connecting the display 120 to the printed circuit board 910. The flexible member 1012 may at least partly overlap with a third area of the first plate 111 when viewed from above the first plate 111, and the first area 111*f* may be positioned between the second area 111*s* and the third area.

According to an embodiment of the present disclosure, an electronic device 100 may include housing 110 including a first plate 111 including a first area 111*f* and a second area 111*s* surrounding the first area 111*f*, a second plate 113 facing the first plate 111, a side member 112 surrounding a space between the first plate 111 and the second plate 113, a display 120 positioned inside the space and exposed through the first area 111*f*, an antenna structure 220 disposed at a location corresponding to the second area 111*s* in the space, and a processor 160 disposed on the second printed circuit board 150 and electrically connected to the wireless communication circuit 226. The antenna structure 220 may include a first printed circuit board 221 attached to the second area 111*s*, a first antenna array 222 disposed in an area adjacent to the second area 111*s* in the first printed circuit board 221, and a wireless communication circuit 226 configured to transmit and receive a signal in a specified frequency band by feeding power to the first antenna array 222, and a second printed circuit board 150 interposed between the display 120 and the second plate.

According to an embodiment of the present disclosure, the antenna structure 220 may further include a second antenna array 223 disposed in an area adjacent to the side member 112 in the first printed circuit board 221.

According to an embodiment of the present disclosure, wherein each of the first antenna array 222 and second antenna array 223 may include at least one of a patch antenna array and a dipole antenna array.

According to an embodiment of the present disclosure, the antenna structure 220 may further include a third antenna array (e.g., the second antenna array 242 of FIG. 2E) disposed in an area adjacent to the second plate 113 in the first printed circuit board 221.

According to an embodiment of the present disclosure, the wireless communication circuit 226 may transmit and/or receive the signal in a direction in which the second area 111*s* is positioned with respect to the first antenna array 222.

According to an embodiment of the present disclosure, the wireless communication circuit 226 may transmit and/or receive the signal in a direction in which the side member 112 is positioned with respect to the first antenna array 222.

According to an embodiment of the present disclosure, the electronic device 100 may further include a shield layer 140 interposed between the display 120 and the second printed circuit board 150 and configured to shield electromagnetic interference (EMI) between the display 120 and the second printed circuit board 150.

According to an embodiment of the present disclosure, at least one of a proximity sensor, an illuminance sensor, a camera, and a receiver may be interposed between the antenna structure 220 and the shield layer 140.

According to an embodiment of the present disclosure, the electronic device 100 may further include a connection member (e.g., the connection member 1012 of FIG. 10A) electrically connecting the first printed circuit board 221 to the second printed circuit board 150.

According to an embodiment of the present disclosure, the second area 111s may correspond to a bezel of the electronic device 100.

Figure 13:
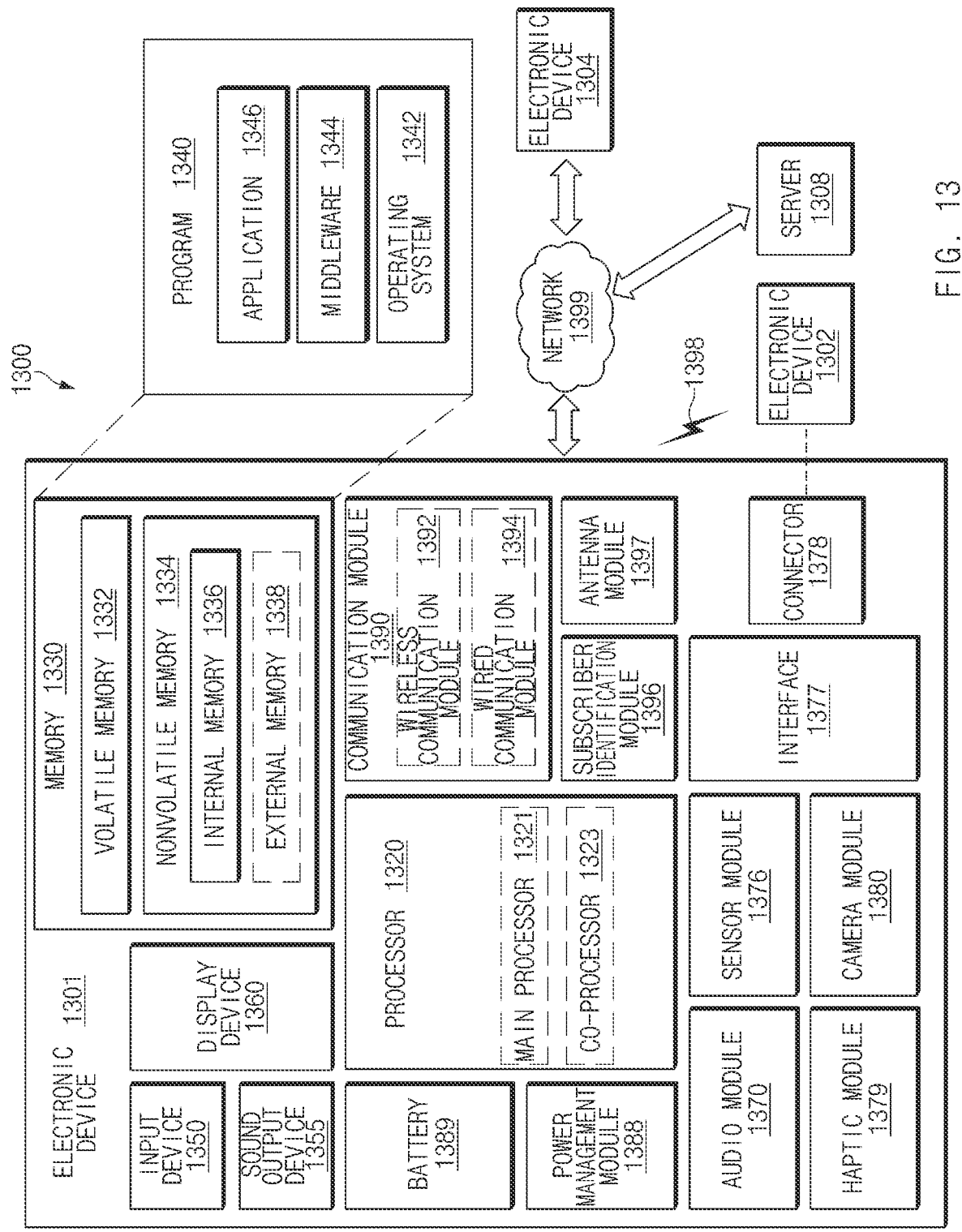
FIG. 13 is a block diagram illustrating an example electronic device in a network environment, according to various embodiments.

FIG. 13 is a block diagram illustrating an example electronic device in a network environment according to various embodiments.

Referring to FIG. 13, an electronic device 1301 may communicate with an electronic device 1302 through a first network 1398 (e.g., a short-range wireless communication) or may communicate with an electronic device 1304 or a server 1308 through a second network 1399 (e.g., a long-distance wireless communication) in a network environment 1300. According to an embodiment, the electronic device 1301 may communicate with the electronic device 1304 through the server 1308. According to an embodiment, the electronic device 1301 may include a processor 1320, a memory 1330, an input device 1350, a sound output device 1355, a display device 1360, an audio module 1370, a sensor module 1376, an interface 1377, a haptic module 1379, a camera module 1380, a power management module 1388, a battery 1389, a communication module 1390, a subscriber identification module 1396, and an antenna module 1397. According to some embodiments, at least one (e.g., the display device 1360 or the camera module 1380) among components of the electronic device 1301 may be omitted or other components may be added to the electronic device 1301. According to some embodiments, some components may be integrated and implemented as in the case of the sensor module 1376 (e.g., a fingerprint sensor, an iris sensor, or an illuminance sensor) embedded in the display device 1360 (e.g., a display).

The processor 1320 may operate, for example, software (e.g., a program 1340) to control at least one of other components (e.g., a hardware or software component) of the electronic device 1301 connected to the processor 1320 and may process and compute a variety of data. The processor 1320 may load a command set or data, which is received from other components (e.g., the sensor module 1376 or the communication module 1390), into a volatile memory 1332, may process the loaded command or data, and may store result data into a nonvolatile memory 1334. According to an embodiment, the processor 1320 may include a main processor 1321 (e.g., a central processing unit or an application processor) and an auxiliary processor 1323 (e.g., a graphic processing device, an image signal processor, a sensor hub processor, or a communication processor), which operates independently from the main processor 1321, additionally or alternatively uses less power than the main processor 1321, or is specified to a designated function. In this case, the auxiliary processor 1323 may operate separately from the main processor 1321 or embedded.

In this case, the auxiliary processor 1323 may control, for example, at least some of functions or states associated with at least one component (e.g., the display device 1360, the sensor module 1376, or the communication module 1390) among the components of the electronic device 1301 instead of the main processor 1321 while the main processor 1321 is in an inactive (e.g., sleep) state or together with the main processor 1321 while the main processor 1321 is in an active (e.g., an application execution) state. According to an embodiment, the auxiliary processor 1323 (e.g., the image signal processor or the communication processor) may be implemented as a part of another component (e.g., the camera module 1380 or the communication module 1390) that is functionally related to the auxiliary processor 1323. The memory 1330 may store a variety of data used by at least one component (e.g., the processor 1320 or the sensor module 1376) of the electronic device 1301, for example, software (e.g., the program 1340) and input data or output data with respect to commands associated with the software. The memory 1330 may include the volatile memory 1332 or the nonvolatile memory 1334.

The program 1340 may be stored in the memory 1330 as software and may include, for example, an operating system 1342, a middleware 1344, or an application 1346.

The input device 1350 may be a device for receiving a command or data, which is used for a component (e.g., the processor 1320) of the electronic device 1301, from an outside (e.g., a user) of the electronic device 1301 and may include, for example, a microphone, a mouse, or a keyboard.

The sound output device 1355 may be a device for outputting a sound signal to the outside of the electronic device 1301 and may include, for example, a speaker used for general purposes, such as multimedia play or recordings play, and a receiver used only for receiving calls. According to an embodiment, the receiver and the speaker may be either integrally or separately implemented.

The display device 1360 may be a device for visually presenting information to the user of the electronic device 1301 and may include, for example, a display, a hologram device, or a projector and a control circuit for controlling a corresponding device. According to an embodiment, the display device 1360 may include a touch circuitry or a pressure sensor for measuring an intensity of pressure on the touch.

The audio module 1370 may convert a sound and an electrical signal in dual directions. According to an embodiment, the audio module 1370 may obtain the sound through the input device 1350 or may output the sound through an external electronic device (e.g., the electronic device 1302 (e.g., a speaker or a headphone)) wired or wirelessly connected to the sound output device 1355 or the electronic device 1301.

The sensor module 1376 may generate an electrical signal or a data value corresponding to an operating state (e.g., power or temperature) inside or an environmental state outside the electronic device 1301. The sensor module 1376 may include, for example, a gesture sensor, a gyro sensor, a barometric pressure sensor, a magnetic sensor, an acceleration sensor, a grip sensor, a proximity sensor, a color sensor, an infrared sensor, a biometric sensor, a temperature sensor, a humidity sensor, or an illuminance sensor.

The interface 1377 may support a designated protocol wired or wirelessly connected to the external electronic device (e.g., the electronic device 1302). According to an embodiment, the interface 1377 may include, for example, an HDMI (high-definition multimedia interface), a USB (universal serial bus) interface, an SD card interface, or an audio interface.

A connecting terminal 1378 may include a connector that physically connects the electronic device 1301 to the external electronic device (e.g., the electronic device 1302), for example, an HDMI connector, a USB connector, an SD card connector, or an audio connector (e.g., a headphone connector).

The haptic module 1379 may convert an electrical signal to a mechanical stimulation (e.g., vibration or movement) or an electrical stimulation perceived by the user through tactile or kinesthetic sensations. The haptic module 1379 may include, for example, a motor, a piezoelectric element, or an electric stimulator.

The camera module 1380 may shoot a still image or a video image. According to an embodiment, the camera module 1380 may include, for example, at least one lens, an image sensor, an image signal processor, or a flash.

The power management module 1388 may be a module for managing power supplied to the electronic device 1301 and may serve as at least a part of a power management integrated circuit (PMIC).

The battery 1389 may be a device for supplying power to at least one component of the electronic device 1301 and may include, for example, a non-rechargeable (primary) battery, a rechargeable (secondary) battery, or a fuel cell.

The communication module 1390 may establish a wired or wireless communication channel between the electronic device 1301 and the external electronic device (e.g., the electronic device 1302, the electronic device 1304, or the server 1308) and support communication execution through the established communication channel. The communication module 1390 may include at least one communication processor operating independently from the processor 1320 (e.g., the application processor) and supporting the wired communication or the wireless communication. According to an embodiment, the communication module 1390 may include a wireless communication module 1392 (e.g., a cellular communication module, a short-range wireless communication module, or a GNSS (global navigation satellite system) communication module) or a wired communication module 1394 (e.g., an LAN (local area network) communication module or a power line communication module) and may communicate with the external electronic device using a corresponding communication module among them through the first network 1398 (e.g., the short-range communication network such as a Bluetooth, a WiFi direct, or an IrDA (infrared data association)) or the second network 1399 (e.g., the long-distance wireless communication network such as a cellular network, an internet, or a computer network (e.g., LAN or WAN)). The above-mentioned various communication modules 1390 may be implemented into one chip or into separate chips, respectively.

According to an embodiment, the wireless communication module 1392 may identify and authenticate the electronic device 1301 using user information stored in the subscriber identification module 1396 in the communication network.

The antenna module 1397 may include one or more antennas to transmit and/or receive the signal or power to or from an external source. According to an embodiment, the communication module 1390 (e.g., the wireless communication module 1392) may transmit and/or receive the signal to or from the external electronic device through the antenna suitable for the communication method.

Some components among the components may be connected to each other through a communication method (e.g., a bus, a GPIO (general purpose input/output), an SPI (serial peripheral interface), or an MIPI (mobile industry processor interface)) used between peripheral devices to exchange signals (e.g., a command or data) with each other.

According to an embodiment, the command or data may be transmitted or received between the electronic device 1301 and the external electronic device 1304 through the server 1308 connected to the second network 1399. Each of the electronic devices 1302 and 1304 may be the same or different types as or from the electronic device 1301. According to an embodiment, all or some of the operations performed by the electronic device 1301 may be performed by another electronic device or a plurality of external electronic devices. When the electronic device 1301 performs some functions or services automatically or by request, the electronic device 1301 may request the external electronic device to perform at least some of the functions related to the functions or services, in addition to or instead of performing the functions or services by itself. The external electronic device receiving the request may carry out the requested function or the additional function and transmit the result to the electronic device 1301. The electronic device 1301 may provide the requested functions or services based on the received result as is or after additionally processing the received result. To this end, for example, a cloud computing, distributed computing, or client-server computing technology may be used.

The electronic device according to various embodiments disclosed in the present disclosure may be various types of devices. The electronic device may include, for example, at least one of a portable communication device (e.g., a smartphone), a computer device, a portable multimedia device, a mobile medical appliance, a camera, a wearable device, or a home appliance. The electronic device according to an embodiment of the present disclosure should not be limited to the above-mentioned devices.

It should be understood that various embodiments of the present disclosure and terms used in the embodiments do not intend to limit technologies disclosed in the present disclosure to the particular forms disclosed herein; rather, the present disclosure should be construed to cover various modifications, equivalents, and/or alternatives of embodiments of the present disclosure. With regard to description of drawings, similar components may be assigned with similar reference numerals. As used herein, singular forms may include plural forms as well unless the context clearly indicates otherwise. In the present disclosure disclosed herein, the expressions "A or B", "at least one of A or/and B", "A, B, or C" or "one or more of A, B, or/and C", and the like used herein may include any and all combinations of one or more of the associated listed items. The expressions "a first", "a second", "the first", or "the second", used in herein, may refer to various components regardless of the order and/or the importance, but do not limit the corresponding components. The above expressions are used merely for the purpose of distinguishing a component from the other components. It should be understood that when a component (e.g., a first component) is referred to as being (operatively or communicatively) "connected," or "coupled," to another component (e.g., a second component), it may be directly connected or coupled directly to the other component or any other component (e.g., a third component) may be interposed between them.

The term "module" used herein may represent, for example, a unit including one or more combinations of hardware, software and firmware. The term "module" may be interchangeably used with the terms "logic", "logical block", "part" and "circuit". The "module" may be a minimum unit of an integrated part or may be a part thereof. The "module" may be a minimum unit for performing one or more functions or a part thereof. For example, the "module" may include an application-specific integrated circuit (ASIC).

Various embodiments of the present disclosure may be implemented by software (e.g., the program 1340) including an instruction stored in a machine-readable storage media (e.g., an internal memory 1336 or an external memory 1338) readable by a machine (e.g., a computer). The machine may be a device that calls the instruction from the machine-readable storage media and operates depending on the called instruction and may include the electronic device (e.g., the electronic device 1301). When the instruction is executed by the processor (e.g., the processor 1320), the processor may perform a function corresponding to the instruction directly or using other components under the control of the processor. The instruction may include a code generated or executed by a compiler or an interpreter. The machine-readable storage media may be provided in the form of non-transitory storage media. Here, the term "non-transitory", as used herein, is a limitation of the medium itself (i.e., tangible, not a signal) as opposed to a limitation on data storage persistency.

According to an embodiment, the method according to various embodiments disclosed in the present disclosure may be provided as a part of a computer program product. The computer program product may be traded between a seller and a buyer as a product. The computer program product may be distributed in the form of machine-readable storage medium (e.g., a compact disc read only memory (CD-ROM)) or may be distributed only through an application store (e.g., a Play Store™). In the case of online distribution, at least a portion of the computer program product may be temporarily stored or generated in a storage medium such as a memory of a manufacturer's server, an application store's server, or a relay server.

Each component (e.g., the module or the program) according to various embodiments may include at least one of the above components, and a portion of the above sub-components may be omitted, or additional other sub-components may be further included. Alternatively or additionally, some components (e.g., the module or the program) may be integrated in one component and may perform the same or similar functions performed by each corresponding components prior to the integration. Operations performed by a module, a programming, or other components according to various embodiments of the present disclosure may be executed sequentially, in parallel, repeatedly, or in a heuristic method. Also, at least some operations may be executed in different sequences, omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

Figure 14:
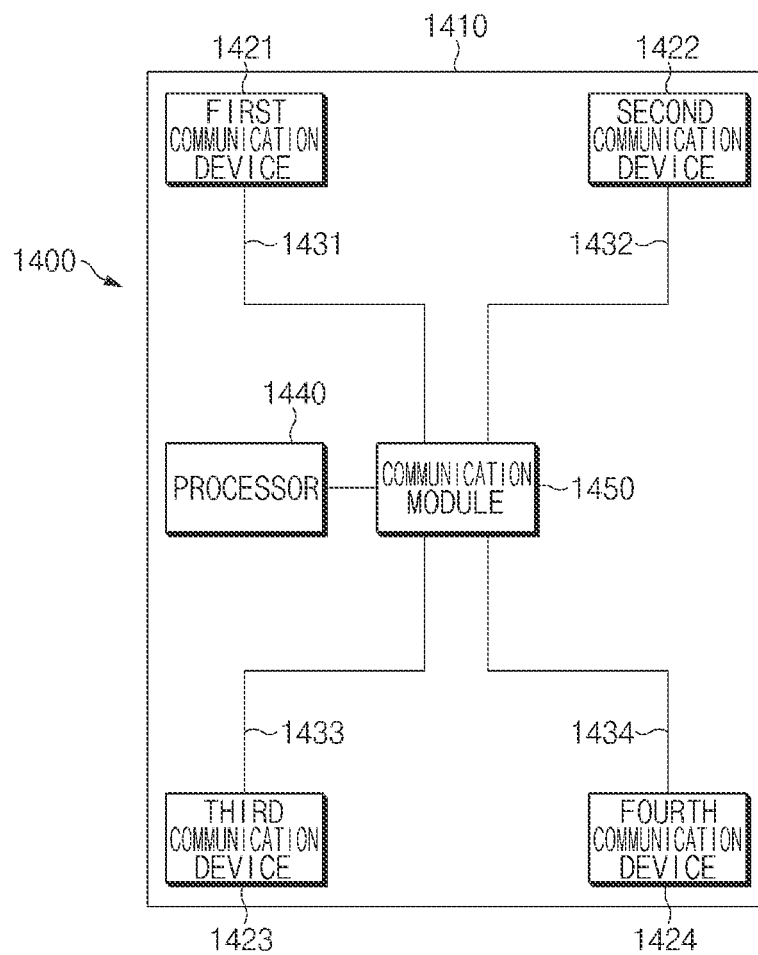
FIG. 14 is a block diagram illustrating an example of an electronic device supporting 5G communication.

FIG. 14 is a diagram illustrating an example of an electronic device 1400 supporting 5G communication.

Referring to FIG. 14, the electronic device 1400 may include a housing 1410, a processor 1440, a communication module 1450 (e.g., the communication module 1390 of FIG. 13), a first communication device 1421, a second communication device 1422, a third communication device 1423, a fourth communication device 1424, a first conductive line 1431, a second conductive line 1432, a third conductive line 1433, or a fourth conductive line 1434.

According to an embodiment, the housing 1410 may protect any other components of the electronic device 1400. The housing 1410 may include, for example, a front plate, a back plate facing away from the front plate, and a side member (or a metal frame) surrounding a space between the front plate and the back plate. The side member may be attached to the back plate or may be integrally formed with the back plate.

According to an embodiment, the electronic device 1400 may include at least one communication device. For example, the electronic device 1400 may include the first communication device 1421, the second communication device 1422, the third communication device 1423, or the fourth communication device 1424.

According to an embodiment, the first communication device 1421, the second communication device 1422, the third communication device 1423, or the fourth communication device 1424 may be positioned within the housing 1410. According to an embodiment, when viewed from above the front plate of the electronic device 1400, the first communication device 1421 may be positioned at an upper left end of the electronic device 1400, the second communication device 1422 may be positioned at an upper right end of the electronic device 1400, the third communication device 1423 may be positioned at a lower left end of the electronic device 1400, and the fourth communication device 1424 may be positioned at a lower right end of the electronic device 1400.

According to an embodiment, the processor 1440 may include one or more of a central processing unit, an application processor, a graphic processing unit (GPU), an image signal processor of a camera, or a baseband processor (or a communication processor (CP)). According to an embodiment, the processor 1440 may be implemented with a system on chip (SoC) or a system in package (SiP).

According to an embodiment, the communication module 1450 may be electrically connected with at least one communication device by using at least one conductive line. For example, the communication module 1450 may be electrically connected with the first communication device 1421, the second communication device 1422, the third communication device 1423, or the fourth communication device 1424 by using the first conductive line 1431, the second conductive line 1432, the third conductive line 1433, or the fourth conductive line 1434. The communication module 1450 may include a baseband processor, an RFIC, or an IFIC. The communication module 1450 may include a baseband processor which is independent of the processor 1440 (e.g., an application processor (AP)). The first conductive line 1431, the second conductive line 1432, the third conductive line 1433, or the fourth conductive line 1434 may include, for example, a coaxial cable or an FPCB.

According to an embodiment, the communication module 1450 may include a first baseband processor (BP) (not illustrated) or a second baseband processor (not illustrated). The electronic device 1400 may further include one or more interfaces for supporting inter-chip communication between the first BP (or the second BP) and the processor 1440. The processor 1440 and the first BP or the second BP may transmit/receive data by using the inter-chip interface (e.g., an inter processor communication channel).

According to an embodiment, the first BP or the second BP may provide an interface for performing communication with any other entities. The first BP may support, for example, wireless communication with regard to a first network (not illustrated). The second BP may support, for example, wireless communication with regard to a second network (not illustrated).

According to an embodiment, the first BP or the second BP may form one module with the processor 1440. For example, the first BP or the second BP may be integrally formed with the processor 1440. For another example, the first BP or the second BP may be positioned within one chip or may be implemented in the form of an independent chip. According to an embodiment, the processor 1440 and at least one baseband processor (e.g., the first BP) may be integrally formed within one chip (a SoC), and another baseband processor (e.g., the second BP) may be implemented in the form of an independent chip.

According to an embodiment, the first network (not illustrated) or the second network (not illustrated) may correspond to the network 899 of FIG. 8. According to an embodiment, the first network (not illustrated) and the second network (not illustrated) may include a 4G network and a 5G network, respectively. The 4G network may support, for example, a long term evolution (LTE) protocol defined in the 3GPP. The 5G network may support, for example, a new radio (NR) protocol defined in the 3GPP.

Figure 15:
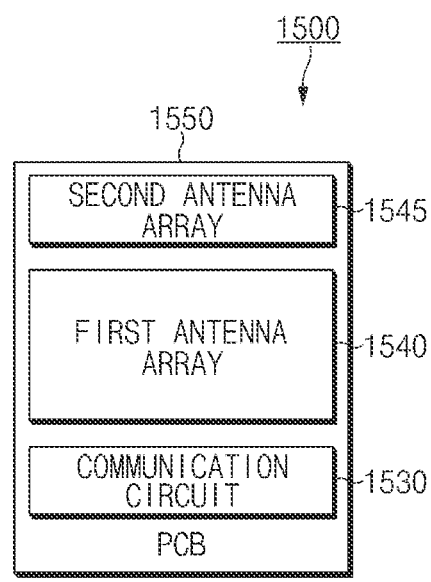
FIG. 15 is a block diagram illustrating an example communication device, according to an embodiment.

FIG. 15 is a block diagram illustrating an example of a communication device 1500.

Referring to FIG. 15, the communication device 1500 may include a communication circuit 1530 (e.g., an RFIC), a PCB 1550, and at least one antenna array (e.g., a first antenna array 1540 or a second antenna array 1545).

According to an embodiment, a communication circuit or at least one antenna array may be positioned on or in the PCB 1550. For example, the first antenna array 1540 or the second antenna array 1545 may be positioned on a first surface of the PCB 1550, and the RFIC 1530 may be positioned on a second surface of the PCB 1550. The PCB 1550 may include a coaxial cable connector or a board to board (B-to-B) connector for electrical connection with any other PCB (e.g., a PCB on which the communication module 1450 of FIG. 14 is positioned) by using a transmission line (e.g., the first conductive line 1431 of FIG. 14 or a coaxial cable). The PCB 1550 may be connected with the PCB, on which the communication module 1450 is positioned, for example, by using a coaxial cable, and the coaxial cable may be used to transmit a receive/transmit IF or RF signal. For another example, a power or any other control signal may be provided through the B-to-B connector.

According to an embodiment, the first antenna array 1540 or the second antenna array 1545 may include a plurality of antenna elements. The plurality of antenna elements may include a patch antenna or a dipole antenna. For example, an antenna element included in the first antenna array 1540 may be a patch antenna for forming a beam toward a back plate of the electronic device 1400. For another example, an antenna element included in the second antenna array 1545 may be a dipole antenna for forming a beam toward a side member of the electronic device 1400.

According to an embodiment, the communication circuit 1530 may support a frequency band ranging from 24 GHz to 30 GHz or ranging from 37 GHz to 40 GHz. According to an embodiment, the communication circuit 1530 may up-convert or down-convert a frequency. For example, a communication circuit included in the first communication device 1421 may up-convert an IF signal received from the communication module 1450 through the first conductive line 1431. For another example, the communication circuit may down-convert a millimeter wave signal received through the first antenna array 1540 or the second antenna array 1545 included in the first communication device 1421 and may transmit the down-converted signal to the communication module 1450.

While the present disclosure has been illustrated and described with reference to various example embodiments thereof, it will be understood by those skilled in the art that various changes in form and details may be made therein without departing from the spirit and scope of the present disclosure as defined, for example, by the appended claims and their equivalents.

What is claimed is:

1. A portable communication device comprising:
   a housing including a front plate, a back plate, and a side member, the front plate including a display area and a bezel area;
   a display accommodated in the housing and visually exposed through the display area;
   a component including circuitry located at least partially under a portion of the bezel area of the front plate;
   a first antenna array including a plurality of antennas and located under the portion of the bezel area of the front plate such that a first signal from the first antenna array is to be at least partially radiated toward the bezel area as a directional beam;
   a second antenna array accommodated in the housing such that a second signal from the second antenna array is to be at least partially radiated toward the back plate;
   a third antenna array accommodated in the housing such that a third signal from the third antenna array is to be at least partially radiated toward the side member;
   a wireless communication circuit electrically connected to the first antenna array and the second antenna array and configured to transmit and/or receive a signal in a frequency range of 3 GHz to 100 GHz; and
   a feed line made of flexible printed circuit board (PCB) and configured to connect the first antenna array with the wireless communication circuit,
   wherein the component and the first antenna array are laterally surrounded by the display area on three sides,
   wherein the first antenna array is spaced apart from the front plate, and
   when looked from above the front plate, the feed line is disposed to at least partially pass under the portion of the bezel area.

2. The portable communication device of claim 1, wherein the display includes an embossing layer extending from the display area to at least part of the bezel area, and
   wherein the first antenna array is connected to the embossing layer.

3. The portable communication device of claim 2, wherein the first antenna array is attached to the embossing layer by an adhesive layer.

4. The portable communication device of claim 2, wherein the display includes:
   an organic light emitting diode layer interposed between the embossing layer and the front plate;
   a conductive layer interposed between the embossing layer and a printed circuit board disposed inside the housing; and
   a heat insulating layer interposed between the conductive layer and the printed circuit board.

5. The portable communication device of claim 1, wherein the wireless communication circuit is attached to a second surface facing away from the side member, or is formed on the second surface.

6. The portable communication device of claim 1, further comprising:
   a printed circuit board disposed in parallel to the front plate and electrically connected to the wireless communication circuit; and
   a processor disposed on the printed circuit board and connected to the display.

7. The portable communication device of claim 6, wherein the wireless communication circuit is attached to a surface of the printed circuit board or is formed on the surface.

8. The portable communication device of claim 6, wherein the wireless communication circuit is electrically connected to the third antenna array.

9. The portable communication device of claim 1, wherein the component includes:

at least one of: a camera, a speaker, a receiver, a light emitting diode, an image sensor, an infrared sensor, a microphone, a fingerprint sensor, an illuminance sensor, and a proximity sensor.

10. The portable communication device of claim 1, further comprising:
a printed circuit board disposed in parallel to the front plate and electrically connected to the wireless communication circuit; and
a flexible member comprising a conductive material electrically connecting the display to the printed circuit board,
wherein the flexible member at least partially overlaps the bezel area when viewed from above the front plate.

11. The portable communication device of claim 1, wherein the first antenna array does not overlap the display as viewed from above.

12. The portable communication device of claim 1, wherein the bezel area has a notch shape surrounded by the display area and the side member.

13. The portable communication device of claim 1, wherein the first antenna array and the second antenna array are connected via a flexible printed circuit board.

14. The portable communication device of claim 1, wherein the wireless communication circuit is a radio frequency integrated circuit (RFIC) configured to transmit a millimeter wave band signal to a corresponding one of the first antenna array and the second antenna array.

15. The portable communication device of claim 1, wherein the wireless communication circuit is at least partially located under the bezel area of the front plate.

16. The portable communication device of claim 1, wherein a first circuit board including the first antenna array and a second circuit board including the second antenna array are connected via a flexible printed circuit board.

17. A portable communication device comprising:
a housing including a front cover;
a display accommodated in the housing and visually exposed through a display area corresponding to the front cover;
a speaker located at least partially under a bezel area corresponding to the front cover;
a first antenna array including a plurality of antennas and located under the bezel area corresponding to the front cover such that signals from the first antenna array are to be radiated in a direction through the front cover of the housing as a directional beam;
a wireless communication circuit; and
a flexible printed circuit board (PCB) including a plurality of feed lines configured to connect the first antenna array with the wireless communication circuit,
wherein the speaker and the first antenna array are laterally surrounded by the display area on three sides,
wherein at least part of the speaker, the antennas of the first antenna array and at least a portion of the feed lines are located under a portion of the bezel area, and
wherein the portion is located between a top edge of the portable communication device and a top edge of the display area.

18. The portable communication device of claim 17, wherein the plurality of antennas of the first antenna array are configured to transmit signals in a frequency range of 3 GHz to 100 GHz.

19. The portable communication device of claim 17, further comprising:
a second antenna array accommodated in the housing such that signals from the second antenna array are to be radiated in a direction toward a rear cover of the housing;
wherein the wireless communication circuit connects the first antenna array and the second antenna array.

20. The portable communication device of claim 17, wherein the first antenna array is spaced apart from the front cover.

21. A portable communication device comprising:
a device enclosure having exterior surfaces of the portable communication device;
a display viewable through a display area of a front surface of the exterior surfaces, wherein the front surface includes the display area and a bezel area surrounding the display area;
a speaker located behind a portion of the bezel area of the front surface, wherein the portion of the bezel area is disposed adjacent a top portion of the portable communication device and the portion of the bezel area;
a first antenna array including a plurality of antennas and located behind the portion of the bezel area such that radio signals from the plurality of antennas are to be radiated as a directional beam through the portion of the bezel area of the front surface;
a wireless communication circuit; and
a flexible printed circuit board (PCB) to connect the plurality of antennas of the first antenna array with the wireless communication circuit using a plurality of feed electrodes,
wherein the component and the first antenna array are laterally surrounded by the display area on three sides, and
wherein the speaker, the antennas of the first antenna array, the feed electrodes and a portion of the flexible PCB are located behind the portion of the bezel area.

22. The portable communication device of claim 21, wherein the flexible PCB transmits the radio signals in a frequency range of 3 GHz to 100 GHz.

23. The portable communication device of claim 21, further comprising: a second antenna array accommodated in the device enclosure such that signals from the second antenna array are to be radiated through the device enclosure except the front cover;
wherein the wireless communication circuit connects to the first antenna array and the second antenna array.

24. The portable communication device of claim 21, wherein the first antenna array is spaced apart from the front surface.

25. The portable communication device of claim 21, wherein the bezel area includes a notch area located between the top edge of the portable communication device and the top edge of the display area of the front surface,
the first antenna array is located behind a first portion of the notch area,
the speaker is located behind a second portion of the notch area, and
the second portion of the notch area is located closer to the top edge of the display area than the first portion of the notch area.

26. The portable communication device of claim 21, wherein the bezel area includes a notch area located between the top edge of the portable communication device and the top edge of the display area of the front surface,
the first antenna array is located behind a first portion of the notch area, an image sensor, accommodated in the device enclosure, is located behind a second portion of the notch area, and the second portion of the notch area is located closer to the top edge of the display area than the first portion of the notch area.

27. The portable communication device of claim 23, wherein the second antenna array includes patch antennas.

28. The portable communication device of claim 23, further comprising a third antenna array accommodated in the device enclosure and connected to the wireless communication circuit.

29. The portable communication device of claim 28, wherein the third antenna array includes patch antennas.

30. The portable communication device of any of claim 28, wherein the wireless communication circuit is configured to transmit a signal in a specified frequency band by feeding power to at least one of the first antenna array, the second antenna array, and the third antenna array.

* * * * *